US005534869A

United States Patent [19]
Harman

[11] Patent Number: 5,534,869
[45] Date of Patent: Jul. 9, 1996

[54] OPEN TRANSMISSION LINE LOCATING SYSTEM

[75] Inventor: Robert K. Harman, Kanata, Canada

[73] Assignee: Auratek Security Inc., Hull, Canada

[21] Appl. No.: 920,563

[22] PCT Filed: Feb. 20, 1991

[86] PCT No.: PCT/CA91/00050

§ 371 Date: Aug. 19, 1992

§ 102(e) Date: Aug. 19, 1992

[87] PCT Pub. No.: WO91/13415

PCT Pub. Date: Sep. 5, 1991

[30] Foreign Application Priority Data

Feb. 20, 1990 [CA] Canada .................................. 2010390

[51] Int. Cl.[6] ...................................................... G01S 13/00

[52] U.S. Cl. .............................................. 342/27; 340/850

[58] Field of Search ........................ 342/27, 22; 340/850

[56] References Cited

U.S. PATENT DOCUMENTS 4,612,536 9/1986 Harman .................................... 342/27
5,019,822 5/1991 Kirkland .................................. 342/22

*Primary Examiner*—Mark Hellner
*Attorney, Agent, or Firm*—Thomas Adams

[57] ABSTRACT

An open transmission line system for locating an entity (110) moving along a defined pathway uses transmissions from a remote, independent transmitter (106), conveniently a commercial radio or television station. The system comprises two receivers, both tuned to the frequency of the transmission. One receiver (101) receives signals directly from the transmitter (106) by means of an antenna (104). The other receiver (102) receives the signal from the transmitter (106) by way of an open transmission line (107). A processor (103) processes the signals from the two receivers to detect the entity. The system may use transmissions at different frequencies from plural mutually-spaced transmitters (402; 403; 404) in order to provide reliability and to minimize the effects of multi-path signals. The system may employ a variable velocity open transmission line (507), comprising a central conductor means (1100) having a permeable central element (1202) carrying a helically wound conductor (1201). The inductance of the cental conductor, and hence the propagation rate of the line is varied by means of a periodically varying signal ($V_m$) applied to the conductor. The entity causes different phase variations at the different propagation rates. The processor (103) compares these phase variations to locate the entity.

64 Claims, 10 Drawing Sheets

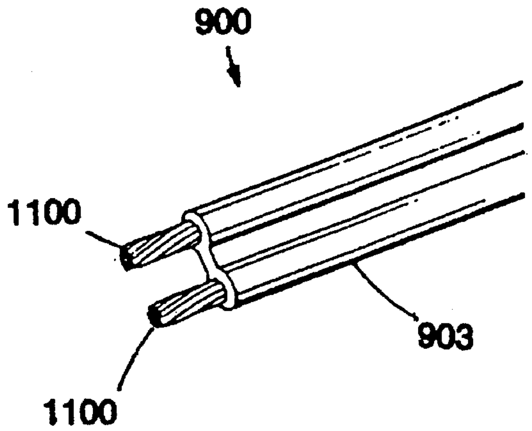
FIG. 9
FIG. 10
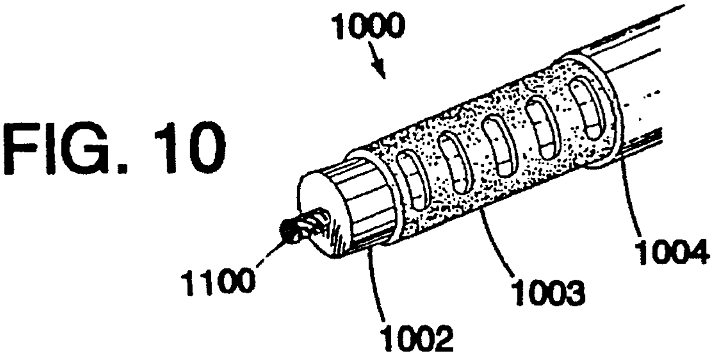
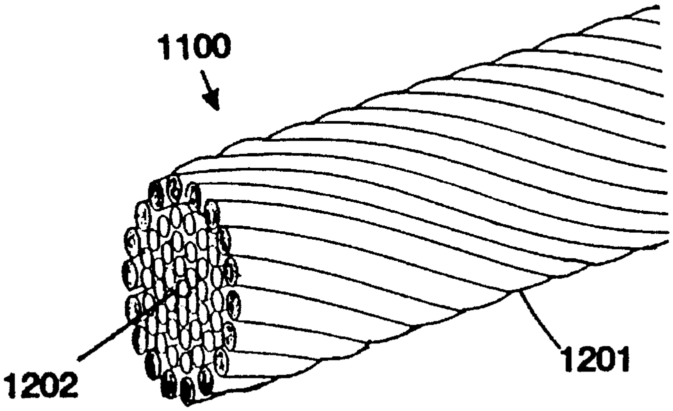
FIG. 12
FIG. 13
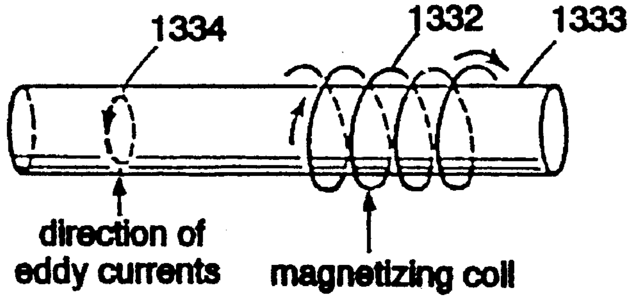

(a) FREQUENCY SPECTRA WITH INCREASING FREQUENCY DEVIATION AND CONSTANT MODULATING FREQUENCY

OPEN TRANSMISSION LINE LOCATING SYSTEM

TECHNICAL FIELD

The present invention relates to open transmission line systems of the kind used for determining the location of objects, things or people moving along a pathway and is especially applicable to so-called "guided radar" intrusion detection systems which use leaky cables as a transducer to detect human intrusions.

Aspects of the invention are applicable whether the objects, things or people carry a radio transmitter, a receiver, a transponder or no electronics whatsoever.

BACKGROUND ART

Known perimeter security sensors or intrusion detection systems utilizing open transmission lines incorporate a source of radio frequency energy as a component of the system. This can be used to set up a field around a transmission line which is monitored by a second parallel line or to set up a field from a central antenna which is monitored by an open transmission line. Guided radar type of intrusion detection systems have been developed using leaky coaxial cables. In most guided radar systems there are two parallel cables. One is used to distribute an electromagnetic field along the desired pathway and the parallel receive cable is used to monitor the field coupling between the two cables and thereby to detect movement of people or objects which disturb the coupling. Both continuous wave (cw) and pulsed type guided radars using leaky coaxial cables have been developed. Canadian patents numbers 1,216,340 and 1,014,245 by Keith Harman et al, both of which are incorporated herein by reference, describe two such guided radar systems.

An alternative form of guided radar which uses a leaky coaxial cable to monitor the field set up by a central antenna is disclosed in Canadian patent No. 1,169,939, by Keith Harman et al. In order to minimize the number of nuisance or false alarms, this system tracks the phase angle which changes as the intruder crosses the cable.

A disadvantage of both such systems is that the transmitter which generates the field is part of the system and in general requires radio regulatory approval.

The present invention seeks to overcome this disadvantage and to this end contemplates the use of an independent transmitter, for example an existing commercial radio or television station, as the source of the field which is subsequently used to detect intruders or other moving objects.

DISCLOSURE OF INVENTION

According to one aspect the invention comprises an open transmission line system for locating a mobile entity along a defined pathway, said system being adapted to utilize transmissions from a remote independent transmitter, for example a commercial radio or television station transmitting at a known frequency, said system comprising an open transmission line extending along said pathway, radio receiver means connected to said transmission line, said radio receiver means including a first receiver for receiving a first signal coupled into and transmitted along said transmission line from said remote station, a second receiver for receiving a second signal directly from said remote station, and means for correlating the first and second signals, said system further comprising signal processing means coupled to said radio receiver means for processing said first and second signals to determine the location of said mobile entity relative to said open transmission line.

Preferably the first and second receivers share a common local oscillator, thus ensuring that they are both tuned to the same frequency and phase information is preserved at the intermediate frequency.

The system may be adapted to use transmissions from a plurality of such remote transmitters. Selector means may then tune both receivers to the different transmission frequencies. In one embodiment, the selector means switches the receivers, alternately between two frequencies of a pair of remote transmitters. Provision may be made for selecting a third frequency so that a third transmitter can be used if one of the others fails. This also minimizes the effects of multipath signals by effectively operating at two or more frequencies. Conveniently, the receivers share a common voltage-controlled local oscillator which is controlled by said selector means. The open transmission line system may be divided into a plurality of blocks, a said radio receiver means and signal processing means being associated with each block.

The open transmission line may comprise any of various types of open transmission lines such as two wire lines (twin lead), leaky coaxial cables, surface waveguides and slotted waveguides which are used as a form of distributed antenna for radio frequency communication and guided radar.

The open transmission line may be constructed using one or more conductors having an inductance per unit length which can be altered by the application of a periodically varying current thereby varying the velocity of propagation of radio frequency signals along said line. The or each variable inductance conductor preferably comprises a magnetically permeable central element surrounded by a helically wound wire. The magnetically permeable central element may comprise a plurality of very fine permeable metal wires which are insulated from each other. There may be a plurality of parallel helically wound wires surrounding the permeable central element, in which case such wires should be insulated from each other and from adjacent turns in the helical winding.

Radio frequency electromagnetic fields are bound to the open transmission line as they propagate along the line. This guided wave nature of open transmission lines makes them attractive as a means of communicating in confined areas such as mines, tunnels or buildings. Likewise, the guided wave facilitates their use as a guided radar transducer for detecting objects or humans intruders where the open transmission line can be installed around corners and up and down hills.

Leaky coaxial cables were introduced in the late 1960's as a type of open transmission line which is suitable for use in VHF and UHF bands of frequencies. In effect, these are ordinary coaxial cables in which the outer conductor is specially designed to allow radio frequency energy to couple between a field propagating inside the cable and a field propagating outside the cable but bound to the outer surface of the cable. In many cases this coupling is achieved by creating holes or apertures in the outer conductor to allow electronic field and magnetic flux lines to penetrate through the outer conductor. There are numerous types of leaky coaxial cables on the market today each with different construction of outer conductor to provide controlled leakage of radio frequency energy both in and out of the cable.

As with all coaxial cables, the field propagating inside a leaky coaxial cable attenuates with distance primarily due to the resistive losses in the conductors. There are also losses in the dielectric material separating the inner and outer conductors and due to the leakage through the apertures, however, these losses are usually small compared to the resistive losses. A uniform electromagnetic field can be created along the outside of the cable by increasing the coupling through the outer conductor with distance to account for the attenuation of the field propagating inside the cable. In the case where the coupling is through apertures in the outer conductor this can be achieved by increasing the aperture size with distance along the cable. This procedure is often referred to as grading and the resultant cable is referred to as a graded cable.

In communications applications the open transmission line is routed along the desired pathway. This could be along a tunnel, down a mine shaft or throughout a building. Two way radios can then be used in proximity to the open transmission line to communicate with a two way radio connected to the end of the line. This is particularly useful in confined areas where direct radio frequency propagation is not possible or is unreliable due to the surrounding material or objects.

Various specific leaky coaxial cable designs have been disclosed in Canadian patents numbers 1,079,804, 1,198,744 and 1,228,900 and in European patent application No. 0,322,128 by Keith Harman et al. Each of these cable designs purports to provide advantages of one form or another for use as transducer elements for guided radar systems.

In the leaky coaxial cable design disclosed in European patent application No. 0,322,128, a high resistance helical winding is wrapped as a second outer conductor over a first outer conductor made from a foil with a longitudinal slot. The helically wound second outer conductor is specifically designed to provide a high resistance and high inductance conductor to support the electromagnetic fields propagating outside the cable. The foil first outer conductor is specifically designed to provide low loss propagation of fields travelling inside the coaxial cable. Numerous problems associated with other leaky cable designs are claimed to be resolved by this particular design of outer conductor. The advantages of such cables for use as transducer elements in guided radar intrusion sensors are also described in the technical article entitled, "DMSA Line" presented at the 1988 IEEE International Carnahan Conference on Security Technology: Crime Countermeasures on Oct. 5–7, 1988 and in the paper entitled, "A Transportable Intrusion Detection Cable" presented at the 20th Annual Meeting of the Institute of Nuclear Materials Management, Orlando, Fla., Jul. 9–12, 1989.

Several of the numerous claims in the European patent application No. 0,322,128 relate to a means of electrically altering the propagation properties of the cable by passing a current through the helical winding to saturate the magnetic material used in the cable construction. It would seem that the purpose is to modify the propagation of fields external to the cable while not affecting the fields propagating inside the cable. If the objective was to alter the velocity of fields propagating inside the cable one must consider how this would affect the clutter values during the MTI, a consideration which was not discussed in this patent. The European publication discloses a helical winding only as the second outer conductor and hence, any variation in the inductance of this winding would only affect fields propagating along the outside of the cable.

As described in lines 54 to 57, column 6 of page 4 of the European publication 0,322,128, one means of increasing the impedance of the second external shield without affecting the internal propagation path is to add ferrite material between the first and second external shields. While this could affect the impedance of the external helical winding it would have little or no effect on the internal impedance of the cable.

Lines 51 through 58 of column 23 and lines 1 and 2 of column 24 on page 13 of the European publication 0,322,128 suggest the use of a conductor with high permeable core material coated with high conductivity material as a means of increasing the inductance of the helical winding. In lines 15 to 19 of column 22 a copper clad steel wire is proposed as one embodiment of an inner conductor. Such a copper clad steel centre conductor will have virtually zero effect on the inductance of the helical winding used as the second external conductor. Hence, passing a current through the helical winding as described in lines 39 through 53 of column 13 on page 8 will not saturate the steel core of the copper clad centre conductor.

Canadian patent No. 1,229,142, by Keith Harman discloses a leaky cable sensor which comprises two leaky cables, each having a different velocity of propagation due to the use of different dielectric core materials thereby having different capacitance per meter for the cables. The primary purpose of using two velocity cables as presented in this patent is to create a more uniform detection capability.

A second aspect of the present invention seeks to provide such uniform detection capability without using two cables, and to this end provides an open transmission line system comprising an open transmission line having a central conductor means the inductance of the central conductor being variable as a means of varying the velocity of propagation inside the cable.

According to this second aspect of the invention, an open transmission line system for locating a mobile entity along a defined pathway in the presence of an alternating electromagnetic field extending in the vicinity both of said pathway and said mobile entity, comprises: an open transmission line adapted to extend along said pathway, said transmission line including means for receiving said electromagnetic field and producing therefrom a transmission signal which propagates along said transmission line; generating means coupled to said transmission line for producing and applying a driving signal to said transmission line; said transmission line including means responsive to said driving signal for controlling the velocity of propagation of said transmission signal along said transmission line; said generating means including means for varying said driving signal to vary, preferably periodically, the velocity of propagation of said transmission signal along said line, and signal processing means adapted to be coupled to one of said transmission line and said mobile entity for receiving said transmission signal and for determining, utilizing the periodic variation in the velocity of said transmission signal, the location of said mobile entity relative to said transmission line.

The open transmission line may be a leaky coaxial cable or a two wire line.

The system may include radio transmitter means associated with said mobile entity for generating said electromagnetic field, and radio receiver means connected to said transmission line to receive said transmission signal, said signal processing means being coupled to said radio receiver means; or radio transmitter means connected to said transmission line for generating said electromagnetic field, and radio receiver means associated with said mobile entity for receiving said transmission signal, said signal processing means being coupled to said radio receiver means; or radio transmitter means connected to said transmission line for generating said electromagnetic field, and radio receiver means associated with said mobile entity for receiving said transmission signal, said signal processing means being coupled to said radio receiver means.

Alternatively, said electromagnetic field may be generated by at least one remotely located, independent transmitter, for example a commercial radio or television station transmitting at a known frequency, said system including a radio receiver connected to said transmission line and adapted to receive a said transmission signal of a frequency corresponding to that transmitted by such commercial station, said signal processing means being coupled to said radio receiver means. Hence, both the first and second aspects of the invention may be combined in one system.

In embodiments of either aspect, the open transmission line may be a two wire line, there being two said variable inductance conductors each comprising a magnetically permeable central element having a said helically wound wire therearound.

According to another aspect, the invention comprises an open transmission line comprising at least one variable inductance conductor means comprising a magnetically permeable central element extending along the length of said conductor, and a wire wound around said central element and being in intimate physical contact with said central element, so that said line has a solenoidal inductance which can be altered by passing a low frequency electric current through said helically wound conductor, thereby altering the velocity of radio signals propagating along the length of said line. The low frequency electric current may be provided by switching between two levels of direct current. The variable velocity conductor may comprise a plurality of wires extending parallel to each other and helically wrapped around said magnetically permeable central element. The magnetically permeable central element may comprise a plurality of fine permeable wires which are insulated from each other to reduce eddy current losses. The wires of said conductor may be formed from copper and said wires of said central element may be formed from steel. The wires of said central element and the wires of said conductor may be twisted to create a helical winding over said centre element.

One embodiment of the transmission line formed using a variable inductance conductor is a leaky coaxial cable, said cable including a dielectric material surrounding said central conductor means, a cylindrical outer conductor extending along said cable outside said dielectric material, said outer conductor having apertures therein to provide a controlled amount of coupling of electromagnetic energy between the inside and outside of said outer conductor.

A second embodiment of the transmission line is a two wire line formed using a variable inductance conductor, there being two said magnetically permeable central elements each having a said conductor wound therearound, each magnetically permeable central element and its associated conductor forming one of the wires of said two wire line.

The variable velocity transmission line requires a generating means connected to said conductor for generating and applying to said conductor a low frequency driving signal for varying the permeability of said central element and thereby varying the velocity of radio frequency signals propagating along said line.

According to another aspect, the invention comprises a method of locating a mobile entity relative to an open transmission line extending along a defined pathway in the presence of an alternating electromagnetic field extending along said pathway, said method comprising detecting at a predetermined location a transmission signal propagating along said transmission line, modulating at low frequency the velocity at which said transmission signal propagates along said line, thereby modulating the phase angle of said transmission signal as it propagates along said line, detecting such phase angle modulation at said predetermined location, and computing utilizing said phase angle modulation the distance along said line between said mobile entity and said predetermined location. The method may include the velocity modulation of said transmission signal to produce an amplitude modulation of the transmission signal detected at said predetermined location, said method including the step of determining, utilizing said amplitude modulation, the radial distance of said entity from said line. The method may include the step of determining said radial distance, including the steps of measuring the amplitude modulation of said transmission signal detected at said predetermined location, calculating the portion of such amplitude modulation produced by travel of said transmission signal along said line, subtracting the calculated amplitude modulation from the measured amplitude modulation, and utilizing the difference to determine said radial distance.

BRIEF DESCRIPTION OF DRAWINGS

Embodiments of the different aspects of the invention will now be described by way of example only and with reference to the accompanying drawings, in which:

FIG. 9 illustrates a two wire line suitable for use as a variable velocity open transmission line;

FIG. 10 illustrates a leaky coaxial cable suitable for use as a variable velocity open transmission line;

FIG. 12, which is on the same sheet as FIG. 10, is a perspective view of a variable inductance conductor which is utilized in the open transmission line used in the systems illustrated in FIGS. 1, 5, 6 and 7;

FIG. 13 illustrates how a current flowing in a helical winding around a cylindrical conductor produces eddy currents in the cylindrical conductor;

BEST MODE(S) FOR CARRYING OUT THE INVENTION

Figure 1:
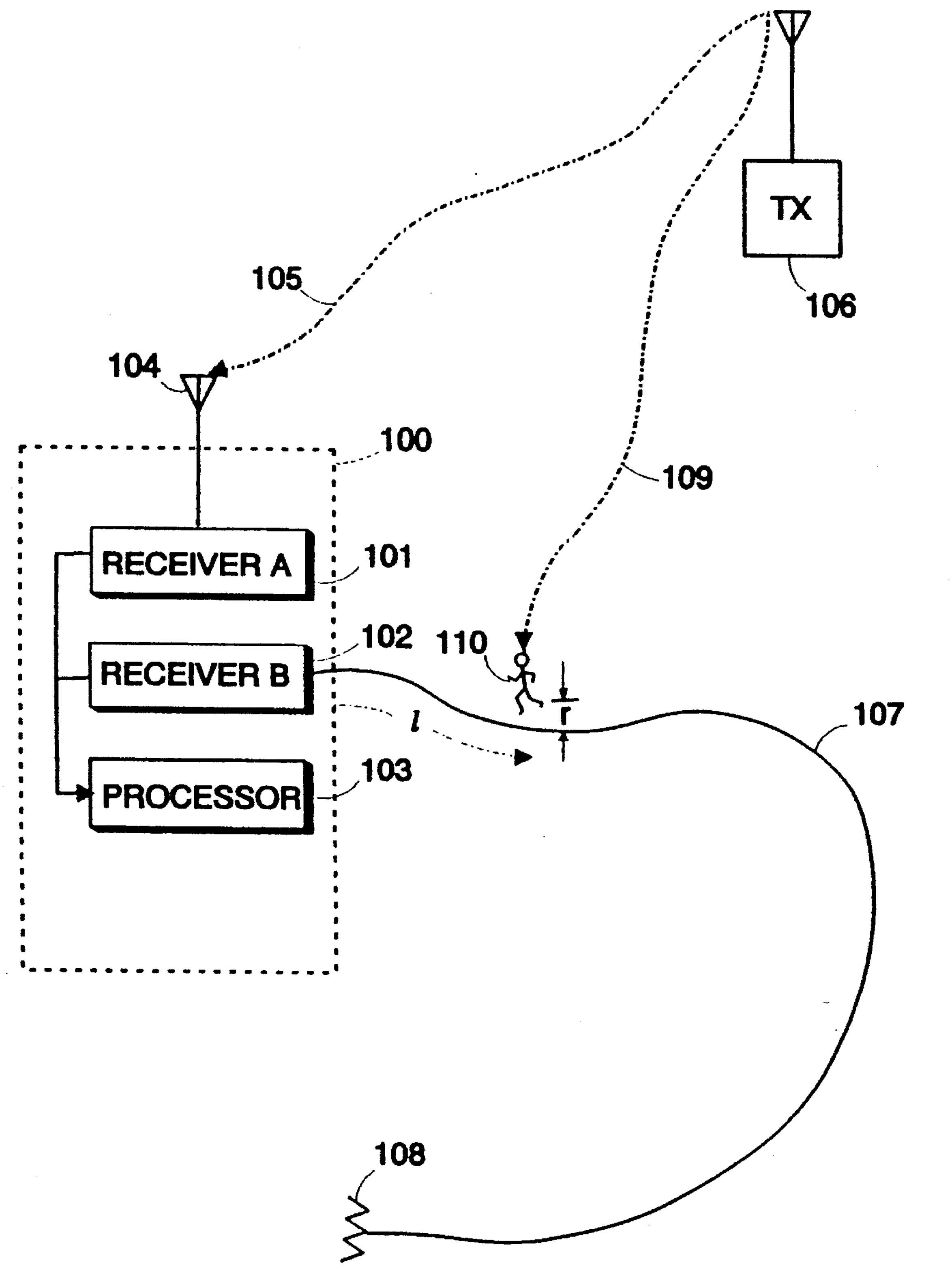
FIG. 1 illustrates an open transmission line system using a commercial radio transmitter to detect and locate a human intruder.

Referring to FIG. 1, an embodiment of the first aspect of the invention is shown to include a stationary unit 100 comprising a first receiver section 101 and a second receiver section 102, with their respective outputs connected to a signal processor 103. Receiver section 101 is connected to an antenna 104 for receiving signals, indicated by line 105, directly from an independent, remote transmitter 106, which may comprise, for example, a commercial AM or FM radio transmitter. The receivers 101 and 102 would be FM or AM receivers depending upon whether the transmitter 106 was FM or AM.

In guided radar systems, one can discriminate small targets by utilizing a frequency at which the desired target is approximately one quarter of a wavelength long. Hence, commercial TV transmissions or FM radio transmissions are quite suitable for the detection of human intruders.

Second receiver section 102 has its input connected to a variable velocity open transmission line 107 terminated by a termination unit 108. Signals from the transmitter 106, indicated by line 109, are coupled into the transmission line 107 by way of intruder or mobile target 110.

The intruder or target 110 moving within the susceptibility range of the open transmission line 107 creates a change in the coupling of the radio signal onto the transmission line 107 and has much the same effect as a mobile transmitter. The exact mechanism by which a passive target such as a human body brings about such a change in coupling can be described in several different ways. One can view the target as a passive antenna which receives energy from the radio transmitter and re-radiates it into the transmission line. One can consider the target as an irregularity in the exterior field of the open transmission line which makes it susceptible to the radio transmission from transmitter 106. (This is simply the reciprocal situation of a discontinuity in the exterior field of an open transmission line causing radiation.) One can consider the radio transmission from transmitter 106 as a source of an electromagnetic field which propagates along the exterior of the open transmission line 107 and that the target disturbs this field and hence the signal coupling into the cable. In fact, all of these explanations are basically correct and compatible with each other. Regardless of which explanation best suits the situation the end result is the same: a portion of the radio transmission is caused to enter the open transmission line due to the presence of the target.

The signal received directly from the transmitter 106 by receiver 101, by way of local antenna 104, serves as a reference signal.

Figure 2:
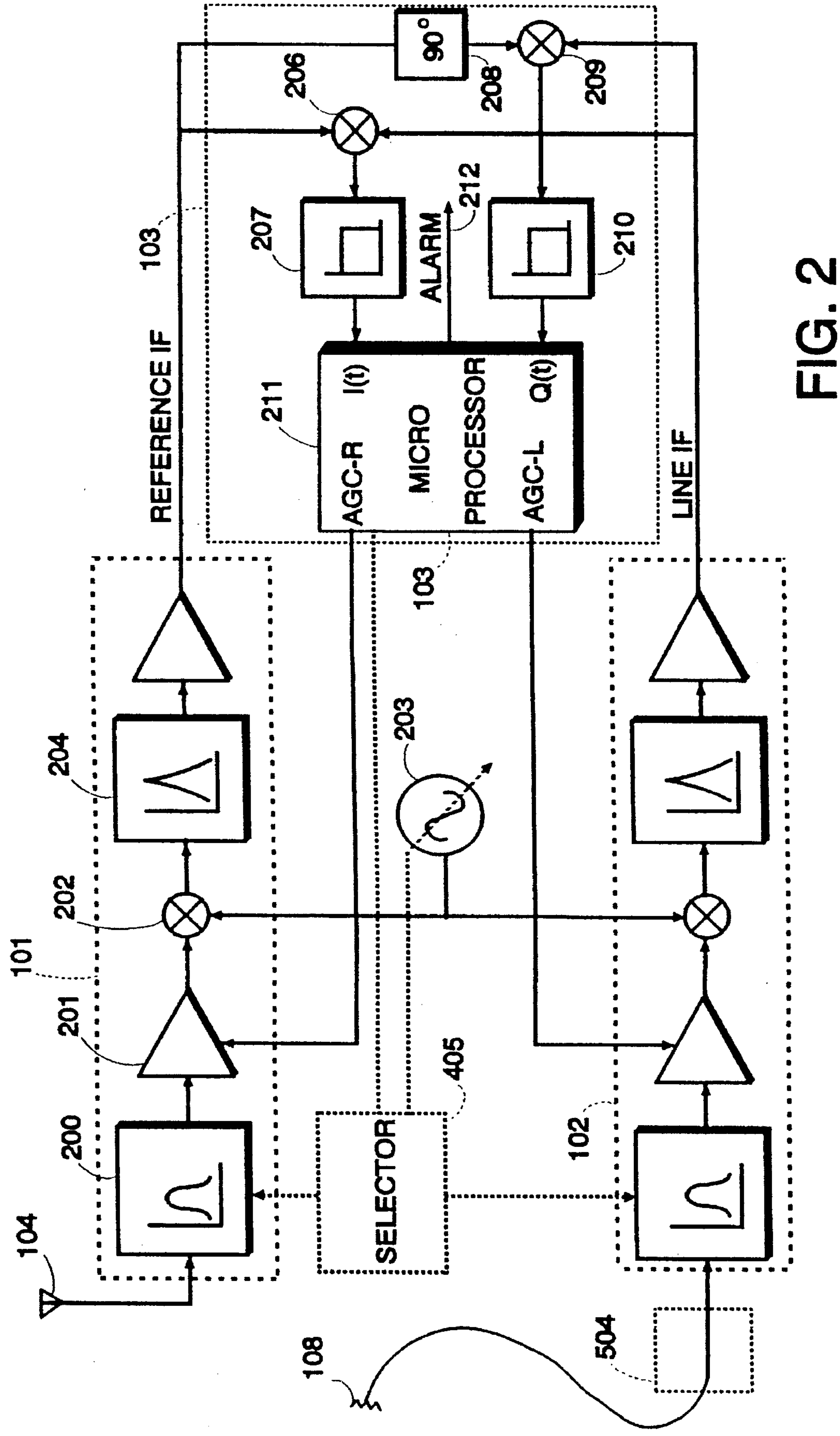
FIG. 2 is a block diagram of a synchronous demodulation circuit used in the system of FIG. 1.
Figure 3:
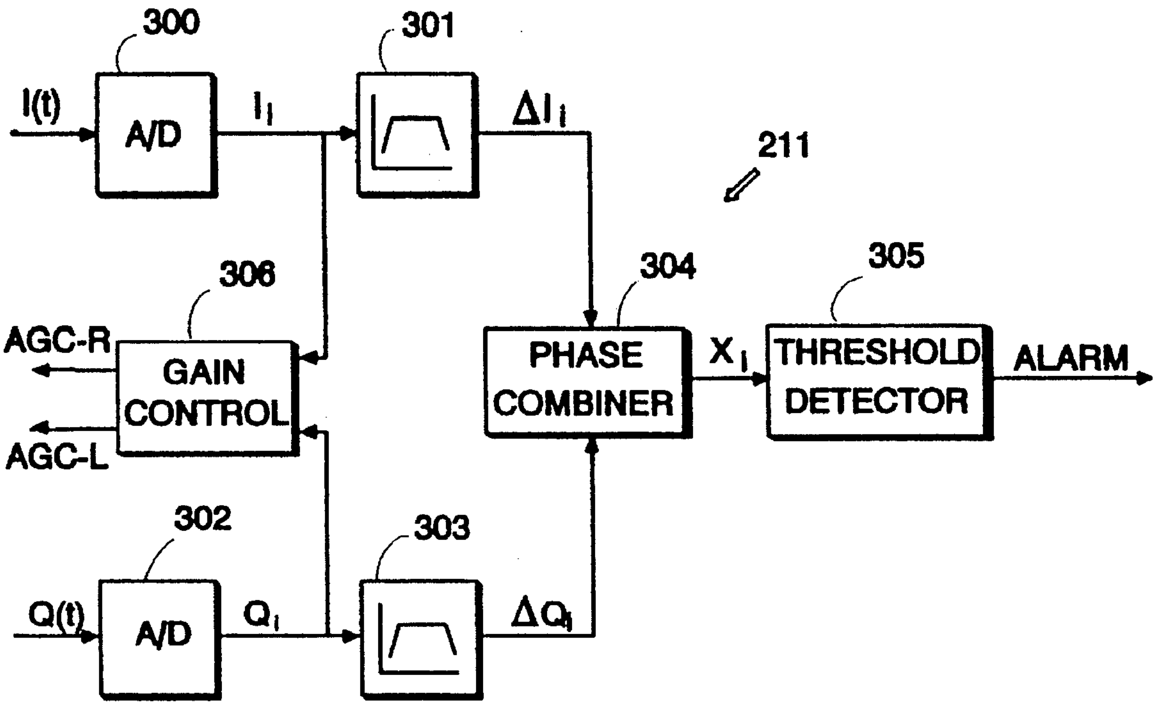
FIG. 3 is a block diagram of a signal processor section of the synchronous demodulation circuit of FIG. 2.

The receiver sections 101 and 102 and signal processor 103 are shown in more detail in FIGS. 2 and 3. The signal processor 103 in a moving target information (MT1) system of the kind disclosed in U.S. Pat. No. 4,091,367 to which the reader is directed for reference and which is incorporated herein by reference.

The two receivers 101 and 102 may be of identical construction so only one will be described. Thus, in receiver 101 the signal from local antenna 104 is applied to a preselection filter 200, the output of which is amplified by preamplifier 201 and supplied to a mixer 202 which mixes it with the output of a local oscillator 203. The preselection filter 200 and the local oscillator 203 are set to tune the receiver 101 to the operating frequency of the transmitter 106. An IF filter 204 extracts the IF signal from the output of mixer 202 and supplies it to an IF amplifier 205, the output of which is the REFERENCE IF signal.

The second receiver 102 is constructed in like manner and operates upon the signal from transmission line 107 to produce a LINE IF signal.

Receivers 101 and 102 share the same local oscillator 203 which ensures that both receivers are tuned to the same radio station and that phase information can be extracted by comparison of the intermediate frequency signals, REFERENCE IF and LINE IF, generated in the two receivers. The change in the rf response received on the open transmission line 107 relative to that of the antenna 105 will produce a change in the relative amplitude and phase of the REFERENCE IF and LINE IF signals.

It should be noted that, whereas conventional FM receivers for receiving commercial stations usually are operated with the intermediate frequency signals being amplitude limited, receivers 101 and 102 must not limit since the processor 103 needs to be able to detect variations in amplitude, as well as phase, caused by an intruder or target. Hence, linear intermediate frequency receivers are used.

In signal processor 103, the REFERENCE IF signal from receiver 101 and the LINE IF signal from receiver 102 are mixed by mixer 208 and then filtered by low pass filter 207 to generate the "in phase" component I(t) of the received signal. The REFERENCE IF signal from receiver 101 is also applied to phase shifter 208 which shifts it by ninety degrees. The phase-shifted REFERENCE IF signal is mixed with the LINE IF signal by mixer 209 and filtered by a low pass filter 210 to generate the "quadrature" component Q(t) of the received signal. The I(t) and Q(t) signals contain all of the desired amplitude modulated (AM) and phase modulated (PM) signals to detect and locate the target 110 but the normal modulation of the radio transmission has been removed by the synchronous detection process. The I(t) and Q(t) signals are applied to a microprocessor 211, the functions of which will be described in more detail later with reference to FIG. 4, which processes them to provide an alarm output signal on output line 212.

For more details of this kind of detection process, known as "synchronous detection", the reader is directed to the aforementioned U.S. Pat. No. 4,091,887.

The microprocessor 211 also generates automatic gain control signals AGC-R and AGC-L which are applied to the preamplifiers of receivers 101 and 102, respectively. Referring to FIG. 3, in which the functions of the microprocessor 211 are represented in block diagram form, an A-to-D converter 300 converts the "in-phase" component I(t) to a 16 bit digital signal $I_i$ which is filtered by recursive bandpass filter 301 to provide a difference signal $\Delta I_i$. A second A-to-D converter 302 and a second recursive bandpass filter 303 operate in like manner upon the quadrature component Q(t) to provide a quadrature difference signal $\Delta Q_i$. The characteristics of the recursive bandpass filters 301 and 303 will depend upon the target to be detected. For detecting a human intruder, suitable corner frequencies are 0.02 Hz and 4.0 Hz. A phase combiner 304 combines the signals $\Delta I_i$ and $\Delta Q_i$ to generate a magnitude signal $X_i$ which is an approximation of the value $M=\sqrt{\Delta I_i^2+\Delta Q_i^2}$. The signal $X_i$ is compared with a threshold T by a threshold detector 305. If the threshold T is exceeded, an alarm output is supplied on line 212 as previously mentioned.

The microprocessor 211 includes a gain controller 306 which computes the automatic gain control signals AGC-R and AGC-L from the digitized in-phase and quadrature components $I_i$ and $Q_i$. Generally, the gain controller 306 computes the magnitude M in accordance with the expression $M=\sqrt{I_i^2+Q_i^2}$. The signals AGC-R and AGC-L are proportional to the value M. The actual proportions may differ to allow for variations between the characteristics of the receivers 101 and 102 and the respective amplitudes of the signals they receive. The microprocessor 211 tracks any gain adjustments and compensates for them when calculating the amplitude of the signal $X_i$. It will be appreciated that, if the gain were adjusted by the receivers 101 and 102 themselves, the microprocessor 211 might interpret the change as evidence of an intruder.

Figure 4:
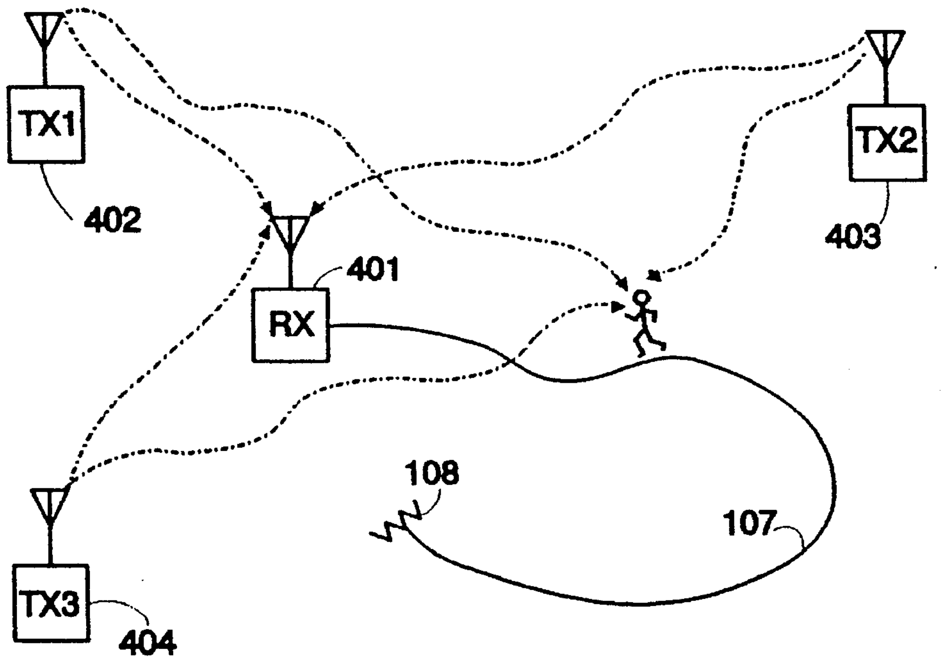
FIG. 4 illustrates a sensor system utilizing three remote commercial radio stations.

It should be apparent that the sensor would become inoperative if the commercial radio station went off the air. For this reason, it may well be desirable for the system to utilize signals from two or more remote, independent transmitters. A system employing a modified stationary unit 401 and three independent and distributed radio stations, 402, 403 and 404 is illustrated in FIG. 4. The stationary unit 401 is similar to stationary unit 101 of FIG. 2 but modified by the addition of a station selector 405 (shown in broken lines in FIG. 2) which, under the control of the microprocessor 211, shifts the frequencies of the preselection filters 200 of the two receivers 101 and 102, together with the frequency of the local oscillator 203, simultaneously. For this purpose, the local oscillator 203 will be a voltage controlled oscillator and the preselection filters will employ varactors. The digital signal processing sections are multiplexed to process the different signal frequencies, i.e. the microprocessor 211 switches the receiver sections 101 and 102 alternatingly between the respective operating frequencies of two of the transmitters, for example 402 and 403. In the event that the signal from one of the transmitters 402 and 403 is not received for a predetermined number of cycles, the microprocessor 211 will select the frequency of the third transmitter, 404, as a substitute.

In some applications one may experience variations in sensitivity to intruders along the line 107 due to multipath signals reflecting from nearby objects. The use of two or more frequencies minimizes these effects because the electrical distance measured in wavelengths from the target to the source of the multipath signal will obviously be different at each frequency and change at a different rate as the intruder moves.

It will be appreciated that an alternative configuration might employ two or more processors contained in the stationary unit 401, each tuned to a different station. If the three commercial radio transmitters 402, 403 and 404 are selected to be located in different directions from the stationary unit 401, important additional phase information can also be obtained. Movement along radial lines from any of the transmitters creates maximum phase rotation in the signal received at the open transmission line. Hence, by having the three transmitters 402, 203 and 404 physically separated from each other the phase response caused by a moving target is different from all three transmissions. The signals from the three receivers can then be processed with a condition that only moving targets be detected by their different phase responses. In practice, motion of puddles of water or intermittent contacts in fence fabric located near to current open transmission line sensor can cause alarms. These false alarms could be eliminated by imposing the multiple phase response condition for moving targets. This is achieved because as a target moves towards one antenna a phase change is produced at the frequency transmitted by the antenna while circumferential movement relative to the antenna would have no effect on phase. Hence using this effect for multiple stations one can make an appropriate phase response a condition of target detection. Wind motion on puddles which might otherwise cause a response would not cause the necessary phase response and hence would not be declared as a false alarm.

The system could be configured in blocks with plural open transmission lines and a time-shared stationary unit. For implementation of such a block sensor system, the reader is directed to Canadian patent No. 1,216,340. It is apparent that like the block sensor described in Canadian Patent 1,216,340 a power and data network could be superimposed upon the open transmission line 107 to avoid the need for power and data lines to each processor unit. The much lower power consumption of the synergistic sensor described in the present patent reduces the power carrying capacity which would allow one to use smaller diameter conductors in the open transmission line relative to those used in the patented system described in U.S. Pat. No. 1,216,340. This lower power consumption also makes the sensor much more compatible with battery operation.

If the primary interest is solely in detecting the presence of passive objects within the radial range of an open transmission line the synergistic use of radio station transmission with a conventional open transmission line may be most appropriate. This would suffice if, for example, a block sensor were desired. On the other hand a variable velocity line provides numerous advantages for many applications.

Figure 5:
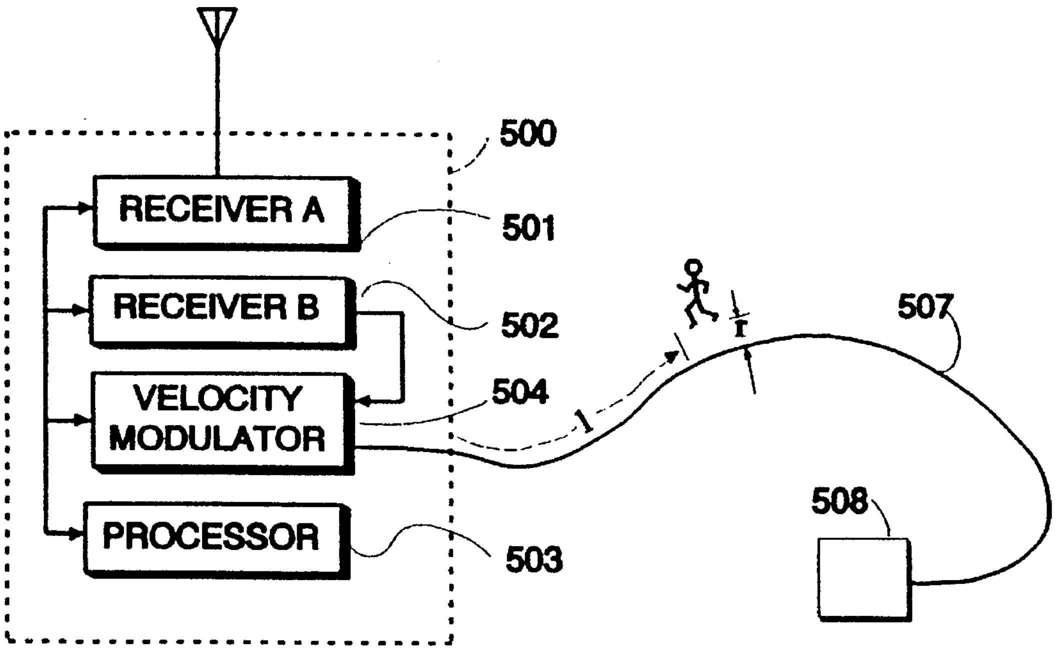
FIG. 5 illustrates a modification of the open transmission line system of FIG. 1, which uses a variable velocity transmission line.
Figure 6:
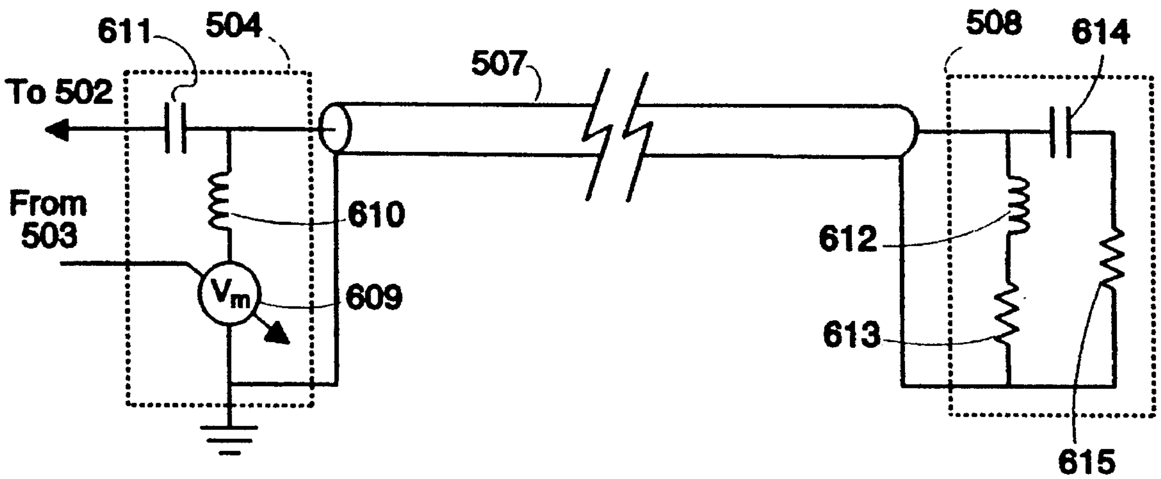
FIG. 6 is a schematic of the electrical circuits employed at the stationary unit and at the load end of the line to apply the modulation current for varying the velocity of propagation.

FIGS. 5 and 6 illustrate how the system can be configured to operate with a variable velocity open transmission line. Thus, in FIG. 5, stationary unit 500 comprises receivers 501 and 502 and processor 503 corresponding to the components of stationary unit 100 of FIG. 1. In addition, however, stationary unit 500 includes velocity modulation circuitry 504 connected to the start of the open transmission line 507 which includes a variable inductance conductor element (not shown in FIGS. 5 and 6).

This configuration has the ability to locate a target along the length of the sensor line or in radial range from the line. Also, the variable velocity has smoothing effects. (Any beat patterns or standing wave effects set up in the external field tend to be altered by the variation in the internal velocity thereby creating a more uniform detection of targets).

The velocity modulator 504, for applying current modulation to the variable velocity open transmission line 507, is shown in FIG. 6. In this case the outer conductor of the leaky coaxial cable is used as the return path for the current applied to the variable inductance central conductor. A voltage source 609, provides a modulating voltage $V_m$ which is inductively coupled to the variable inductance conductor of line 507 by means of inductor 610. A capacitor 611 couples the radio frequency signals from the open transmission line 507 to the rf port of receiver 502 (FIG. 2). In the termination unit 508 inductor 612 and series resistance 613 are connected across the line 507 and a capacitor 614 couples rf energy from the line to load resistor 615 which is selected so that the desired 1.4 amperes of modulating current is attained.

In processing the radio frequency signals received from the variable velocity line 507 the processor 503 must take into account the fact that this also alters the clutter values in the MTI processing. One of the easiest means of accommodating this is to utilize only a limited number of distinct velocities and store the appropriate clutter values for each velocity.

Figure 7A:
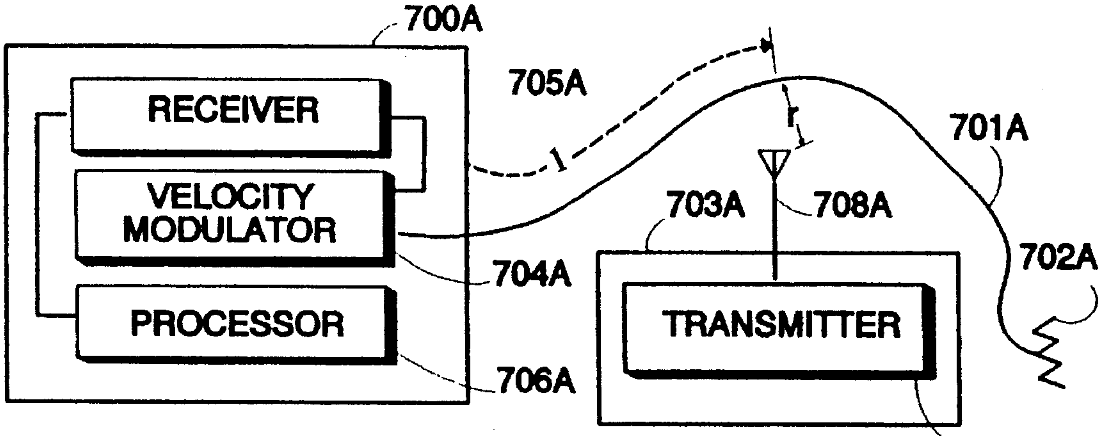
FIG. 7A illustrates an embodiment of a second aspect of the invention in the form of a variable velocity open transmission line system for locating a mobile transmitter.
Figure 7B:
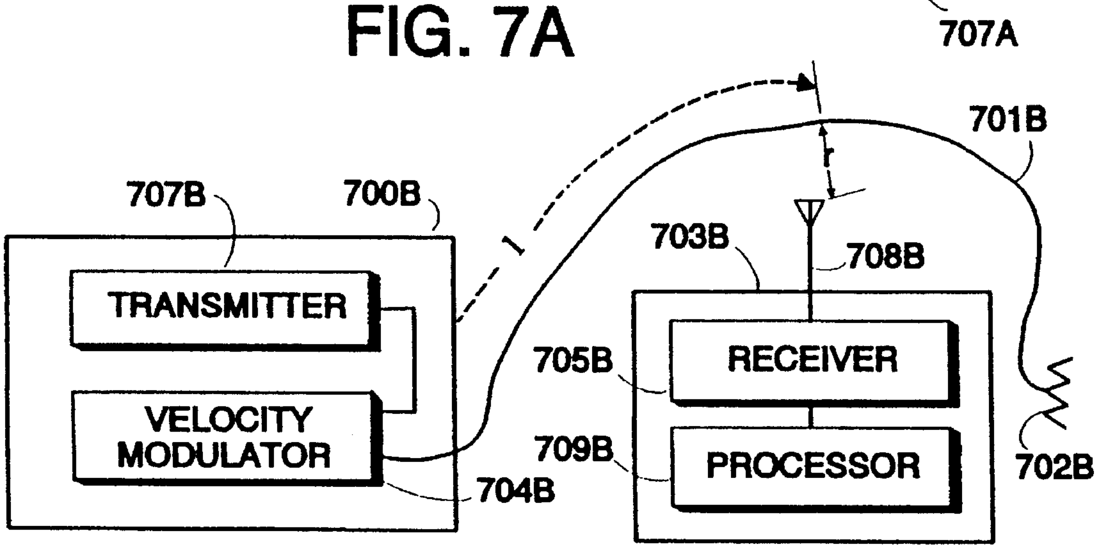
FIG. 7B illustrates another embodiment of a variable velocity open transmission line system for locating a mobile receiver.
Figure 7C:
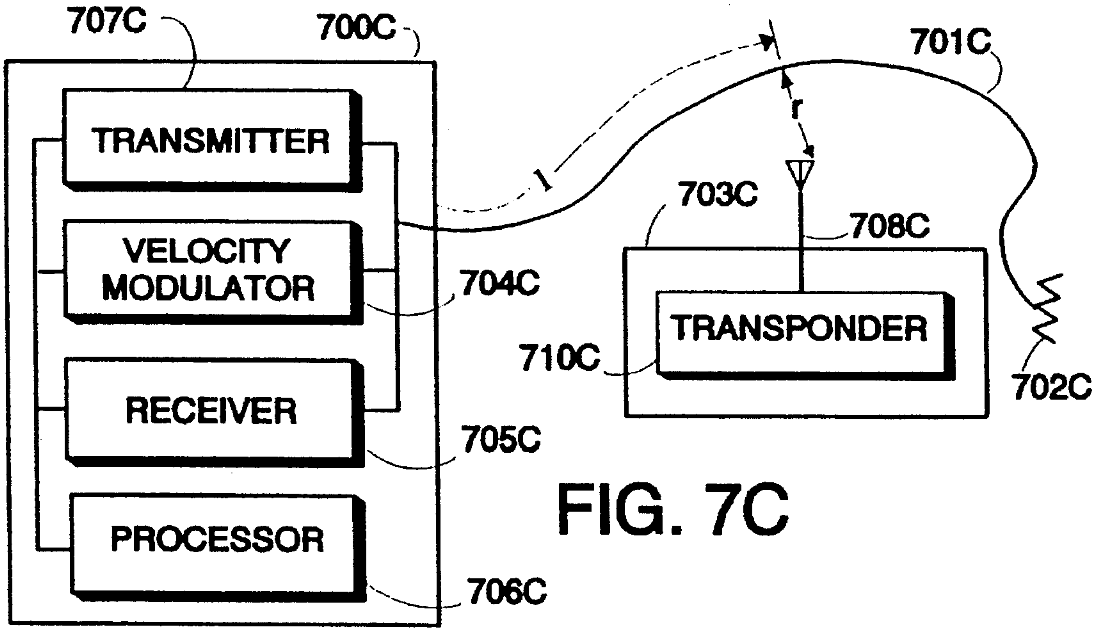
FIG. 7C illustrates yet another embodiment of a variable velocity open transmission line system for locating a mobile transponder.

It should be appreciated that this variable velocity open transmission line concept is not limited to use with remote, independent transmitters such as commercial radio or television stations but could be applied to other sensor systems. Examples of other systems utilizing a variable velocity line are illustrated in FIGS. 7A, 7B and 7C corresponding components having the same reference numeral but with the suffix A, B or C as appropriate. Each system includes a stationary unit 700 connected to the start of a variable velocity open transmission line 701, and a terminator unit 702 connected to the end of the variable velocity open transmission line 701. A mobile unit 703, is located at a distance l meters along the transmission line 701 and at a radial distance of r meters from the transmission line 701. The primary purpose of each systems is to determine the location of the mobile unit 703, in terms of the distances l and r as it moves along the pathway defined by the routing of the variable velocity open transmission line 701. The system operates when the antenna of the mobile unit 703 is within range of coupling with the open transmission line 701. Typically, one can envisage applications with lengths of open transmission line from a few tens of meters to many kilometres and radial ranges from a few centimetres to tens of meters. The system can be designed to accommodate virtually any speed of movement of the mobile unit but these would normally be speeds associated with the movement of people or vehicles along a pathway ranging from zero to hundreds of kilometres per hour.

In the embodiment of FIG. 7A, the stationary unit 700A, includes a radio frequency receiver 705A, signal processor 706A and a velocity modulator 704A. The mobile unit 703A includes a radio frequency transmitter 707A. In its simplest form the radio frequency transmitter 707A included in the mobile unit 703A produces a Continuous Wave (cw) signal which emanates from the antenna 708A on the mobile unit 703A. This radio frequency signal couples into the variable velocity open transmission line 701A. Because of the quasi TEM (Transverse Electro-Magnetic) nature of most open transmission lines, there is negligible phase delay associated with radial range r. On the other hand, there is a rapid attenuation of the signal with radial range due to the surface wave nature of the fields associated with open transmission lines. The radio frequency signal coupled into the variable velocity open transmission line 701A propagates in both directions along the line. The signal propagating away from the stationary unit 700A travels along the line to be absorbed without reflection in the terminator unit 702A. It is the signal which propagates along the variable velocity open transmission line 701A to the stationary unit 700A which is of primary interest. A modulation current supplied by the velocity modulator 704A to the variable velocity open transmission line 701A causes a phase modulation of the signal received at the stationary unit 700A. The phase angle associated with the propagation along l meters of line is $$\Phi = \frac{2\pi f}{v_0} \frac{l}{v_l} \tag{2}$$

where as previously defined $v_0$=velocity of propagation in free space $v_l$=relative velocity of line propagation f=frequency As the relative line velocity, $v_l$, is modulated there is an associated modulation of phase angle, $\phi$, which is directly proportional to the distance, l, that the radio frequency signal propagates along the variable velocity open transmission line. A standard phase detector circuit is used in the receiver 705A contained in the stationary unit 700A, to measure $\phi$ as it changes with the velocity modulation. This modulated phase angle is then digitized and equation (1) is used to compute the distance l. It is recognized that any Frequency Modulated (FM) receiver can equally well be used to determine $\phi$.

The computation of the radial range, r, from the amplitude modulation of the received signal is complicated by the fact that the characteristic impedance, $Z_0$, and hence the rate of attenuation, a, are also affected by the variation in the inductance of the transmission line. Based upon a knowledge of $L_8$ at any instant of time one computes $Z_0$ (equation 3) which in turn is used to compute a (equation 5). The distance l having been computed previously, the total attenuation inside the cable can be computed as the product, $\alpha l$. This attenuation constitutes the part of the amplitude modulation which is due to the variations in cable attenuation. The remaining part of the amplitude modulation, $B_m$, is due to the variation in radial decay rate. The velocity, V, is then computed (equation 2) and is used to compute, u, (equation 7) which is used to determine the radial range r (equation 6). Equations 3, 5, 6 and 7 are set out in detail later.

Figure 8:
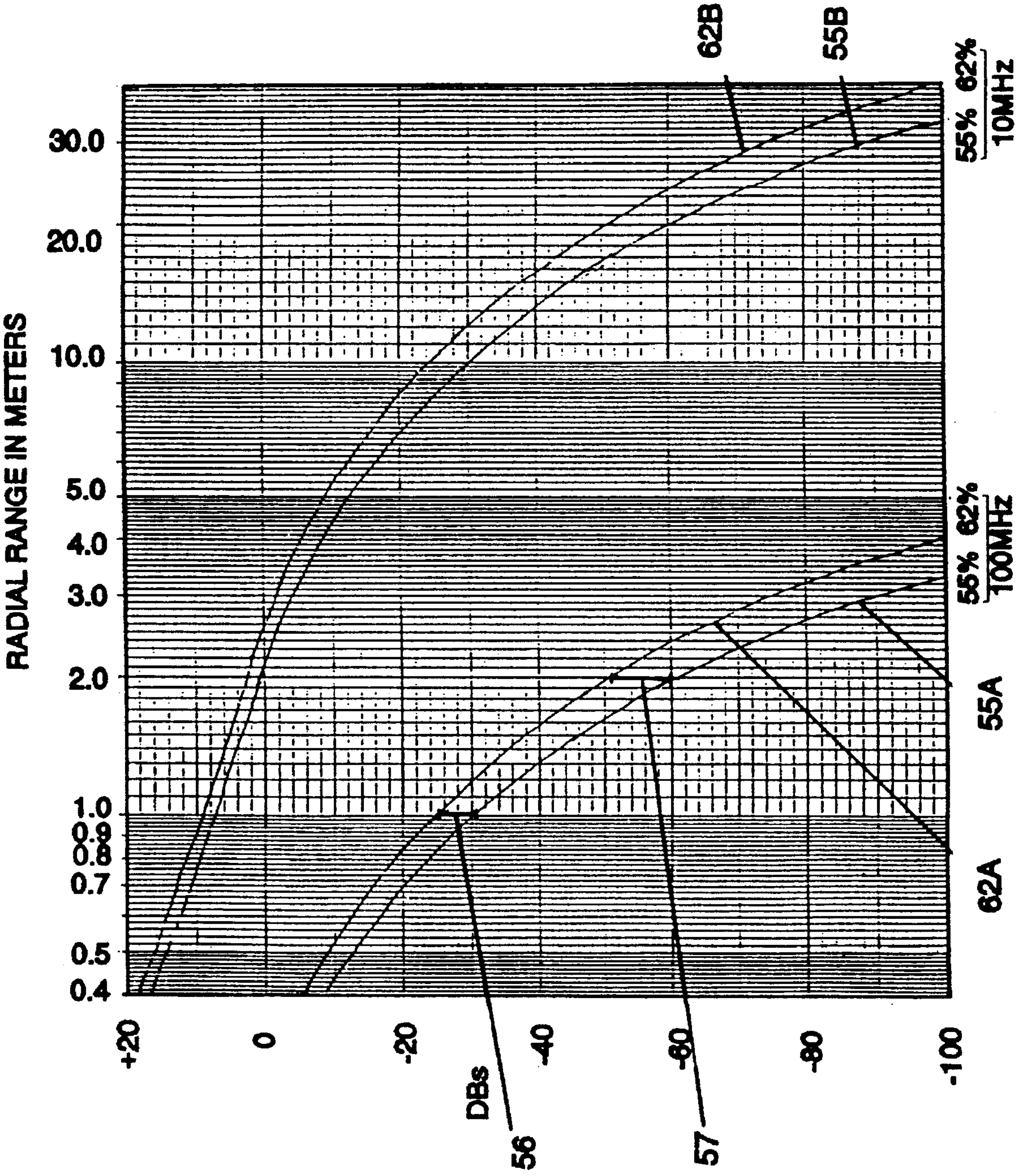
FIG. 8 is a graphical representation of the radial decay functions for open transmission lines operating at 10 MHz and 100 MHz with relative velocities of 55 and 62 percent, the velocity of free space.

Rather then performing all of these calculations it is easier to use a "look up table" representation of the radial decay factors such as those shown in FIG. 8. In FIG. 8 curves 55A and 55B represent a radial decay rate for a transmission line with a propagation velocity of 55 percent that of free space at 100 MHz and 10 MHz respectively. Likewise, curves 62A and 62B represent the radial decay rate for the same line with a propagation velocity of 62 percent that of free space at 100 MHz and 10 MHz respectively. If we assume operation at 100 MHz a modulation factor of 2.5 dbs corresponds to a radial range of 1.0 meters as shown by line 56 in FIG. 8 and a radial range of 5.0 db corresponds to a radial range of 2.0 meters as shown in line 57 in FIG. 8. It should be noted that the radial range calculation become difficult for small radial ranges where the two decay curves become virtually parallel. In the examples shown in FIG. 8 the range computation is useful at 100 MHz above approximately ½ meter while at 10 MHz it is only useful above approximately 2 meters.

In the embodiment of the invention illustrated in FIG. 7B the stationary unit 700B includes a radio frequency transmitter 707B and a velocity modulator 704B. The mobile unit 703B includes the radio frequency receiver 705B and processor 709B. The well known reciprocity theorem of electrical engineering applies to the variable velocity open transmission line system. Hence, the processor 709B in the mobile unit 703B performs the same function as when it was part of the stationary unit and thereby computes both l and r, as previously described.

There is one significant difference between the embodiment of the invention shown in FIGS. 7A and 7B. In the first case, FIG. 7A, the electromagnetic field producing the coupling can be a simple continuous wave utilizing virtually zero bandwidth. In the second case, FIG. 7B, the field producing the coupling is a phase modulated signal whose amplitude of modulation increases along the length of the line. Hence, the radio frequency bandwidth utilization ranges from zero at the stationary unit 700B to reach its maximum at the termination unit 702B.

In the embodiment of the invention illustrated in FIG. 7C the mobile unit 703B contains a radio transponder 710C and the stationary unit 700C contains a transmitter 707C, velocity modulator 704C, receiver 705C, processor 708C. The initial radio frequency signal is transmitted from the stationary unit 700C along the variable velocity open transmission line 701C. The transponder 710C contained in the mobile unit 703C receives the transmitted signal and retransmits a signal derived from the signal received by the transponder. This secondary transmission couples into the variable velocity open transmission line 701C. Part of this secondary transmission propagates along the variable velocity open transmission line to the terminator unit 702C where it is absorbed without reflection. The part of the secondary transmission of interest propagates back to the stationary unit 700C where it is received and processed to determine l and r as described previously.

Various types of transponders can be utilized in this embodiment of the invention. One possible embodiment is a transponder that receives a signal, doubles its frequency, and amplifies and retransmits this secondary signal. Alternatively, the transponder can be passive in nature performing the same function but without amplification thereby avoiding the need for power at the mobile unit. Naturally, any frequency can be used as the secondary signal and it need not be locked to a harmonic of the received signal provided the appropriate processing is performed at the stationary unit 700C. Alternately, more than one open transmission line can be used so that the transmitted signal from the stationary unit 700C propagates on one cable and the received signal on a second cable thereby simplifying the use of line amplifiers.

The utilization of the radio frequency spectrum is an important factor to consider when designing a variable velocity open transmission line system. In the embodiment of FIG. 7A virtually zero bandwidth would be used if a continuous wave (cw) transmission is used on the mobile unit. In the embodiments of FIGS. 7B and 7C cw transmission can also be used but the modulation produced by the variable velocity open transmission line would zero bandwidth utilization of the spectrum at the start of the line to a maximum bandwidth at the end of the line. Naturally, the use of any form of modulated transmission for communication would use bandwidth in all embodiments of the invention. In the embodiments using a commercial transmitter, the spectrum utilization is that already used by the radio station and hence no licensing is required.

The following discussion of variable velocity modulation is applicable to the embodiments of FIGS. 5, 7A, 7B and 7C. In each case, the velocity modulator provides a modulating current to the variable inductance conductor element as will be described later, with reference to FIG. 12, the central conductor of the open transmission line comprises a helically wound outer layer of the variable inductance conductor thereby creating a magnetic flux in the permeable central element of the conductor. Very fine insulated permeable wires are used to form the central element of the variable inductance conductor so that the eddy currents in the central element are minimized. It is this reduction in eddy currents by using very fine insulated permeable wires that allows the central element to exhibit a magnetic permeability at radio frequencies which is greater than that of free space. The relatively low amplitude radio frequency currents flowing in the variable inductance conductor are affected by the incremental inductance of the conductor. The relatively high amplitude low frequency modulating current flowing in the variable inductance conductor creates a magnetic flux which forces the permeable central element to traverse its hysteresis loop thereby modulating the incremental inductance. It is this modulated incremental inductance that causes the modulation of the velocity of propagation along the open transmission line.

The modulation of the propagation velocity of the open transmission line allows one to determine the distance that the radio frequency signal has travelled along the line. Most open transmission lines of interest have a normal propagation velocity which is somewhat less than the free space velocity of light. In this case the term normal propagation velocity is defined as the velocity of propagation when there is zero modulation current flowing in the variable inductance conductor. This normal propagation velocity depends upon the structure of the open transmission line including the permittivity of the dielectric materials used in its construction and the inductance of the conductors. Provided that the incremental inductance of the variable inductance conductor is designed to be of appreciable magnitude relative to the inductance of the open transmission line itself then variation of this incremental inductance will cause a modulation of the propagation velocity of the transmission line. The modulation current in the variable inductance conductor causes the incremental inductance to decrease from its normal value thereby causing the overall inductance of the line to decrease and hence to cause the propagation velocity to increase from its normal value. The time delay of a signal propagating along the open transmission line is inversely proportional to the velocity of propagation and directly proportional to the distance travelled along the transmission line. In other words, the time taken by the signal to propagate along the transmission line in seconds equals the length of the propagation path in meters divided by the velocity of propagation expressed in meters per second. Modulation of the propagation velocity causes a modulation of the phase of the signal propagating along the variable inductance open transmission line. The longer the propagation distance the larger the modulation angle. Hence, the phase modulation imposed by the variable inductance conductor element of the open transmission line is directly proportional to the propagation distance along the transmission line.

The modulation of the propagation velocity of the open transmission line also enables one to determine the radial distance from the mobile unit antenna to the open transmission line. The electromagnetic field propagating in the space around the open transmission line are primarily of a surface wave nature bound to the surface of the open transmission line. Typically this field decays with radial distance as a Modified Bessel Function of the Second Kind. As illustrated in FIG. 8, radial decay function is dependent upon the velocity of propagation along the transmission line. The slower the velocity of propagation the more rapid the radial decay rate and the field is said to be more tightly bound to the transmission line. Hence, the modulation of the velocity of propagation along the transmission line causes a modulation of the radial decay function. This causes an amplitude modulation of the signal coupling between the open transmission line and the mobile unit antenna. By measuring the amplitude modulation of the signal coupled between the open transmission line and the mobile unit antenna one can determine the radial distance.

There are a number of types of open transmission line which can be created using the variable inductance conductor disclosed herein. Three particular types of open transmission line which illustrate the utility of the present invention are:

1. Two Wire Lines (Twin Lead),
2. Leaky Coaxial Cables (Ported Coaxial Cables),
3. Surface Wave Guides, and
4. Leaky Waveguides.

In each case one or more of the usual conductors is replaced by a variable inductance conductor to create a variable velocity open transmission line. The particular type of open transmission line and the specific design of the line in large part depends upon the application. In general when a large radial range is desired and environmental conditions are stable one would use a two wire line operating in the High Frequency (HF) range of 3–30 MHz. If a lesser radial range is desirable and the environmental conditions are not stable a leaky coaxial cable operating in the Very High Frequency (VHF) range of 30–300 MHz would be selected. If a very small radial range is desired and the environment is stable a surface wave line or leaky waveguide operating in the Ultra High Frequency (UHF) range would be selected. The higher the operating frequency the wider the bandwidth available for communications. This is intended only as very general guideline in selecting a type of open transmission line. In fact, all types of lines can be used to advantage outside of the ranges cited for specific applications.

From transmission line theory the velocity of propagation, v, and the characteristic impedance, $z_0$, of the variable velocity transmission line are given by the following equations:

$$v=\sqrt{\frac{1}{(L+Ls)\,C}} \tag{2}$$

and $$z_0=\sqrt{(L+L_s)/C} \tag{3}$$

where

L=inductance per meter of transmission line with the variable inductance conductor replaced by a normal conductor.

C=capacitance per meter of the transmission line.

$L_8$=inductance per meter of transmission line associated with the variable inductance conductor. The inductance of the variable inductance conductor is given by $$L_8=\mu_{eff}\mu_0\pi(cN)^2 \tag{4}$$

where $\mu_{eff}$=the effective relative permeability of the central element of the helically wound variable inductance conductor.

$\mu_0$=permeability of free space c=radius of the variable inductance central element N=number of turns per meter of the helical wound variable inductance conductor.

It is the effective relative permeability in equation (4) which is modulated by the modulation current. The attenuation of the variable velocity open transmission line is approximated by $$\alpha=\frac{R}{2Z_0}\ \text{(nepers/meter)} \tag{5}$$

where

R=resistance per meter of the conductors.

It must be noted that with the velocity modulation there is an associated modulation of the characteristic impedance and hence a modulation of the "along the line" attenuation. Hence, in order to determine the radial distance between the antenna of the mobile unit and open transmission line one must correct for the variation in "along the line" attenuation caused by the variation in characteristic impedance. In addition, one needs to approximately match the characteristic impedance at the load end to avoid reflections.

The Modified Bessel Function radial decay factor is given by $$B_m=B_0K_1(ur) \tag{6}$$

where $B_0$=a constant, $K_1$=Modified Bessel Function of the Second Kind, u=radial decay factor, and r=radial distance in meters.

The radial decay factor is given by $$u=\frac{2\pi f}{c}\sqrt{\left(\frac{1}{v_1}\right)^2-1} \tag{7}$$

where f=the radio frequency in hertz c=free space velocity of light $v_1$=relative velocity of the transmission line.

Equations (6) and (7) can be used to compute the radial range, r, based upon the amplitude modulation once corrected for the variation in along line attenuation.

In order to use the present invention for very long lengths one should consider the use of grading and the use of line amplifiers. The line attenuation as defined in equation (5) causes the signal to diminish with distance along the transmission line. As in other open transmission line systems once can compensate for this effect by grading the transmission line. This is achieved by modifying the transmission line design to increase coupling to the external field with distance. For example, this can be achieved in a leaky coaxial cable by increasing the aperture size with distance along the cable. Amplifiers are then added in the open transmission line and the grading repeated to achieve very long lengths. If two way communication is required it is normal to use two different frequencies so that the amplifiers can function in both directions. Alternatively, a second parallel open transmission line can be used to accommodate operating at a single frequency with amplifiers pointing in opposite directions in each transmission line. The use of grading and of amplifiers is common with current usage of open transmission lines for communication and for guided radar.

FIGS. 9 and 10 illustrate the construction of a variable velocity open transmission line. In FIG. 9 a two wire variable velocity open transmission line 900 comprises two conductors 901 and 902 each formed of variable inductance wire of radius b. The construction of these conductors 901 and 902 will be described later with reference to FIG. 12. The jacket material 903 maintains the spacing between the two wires and the dielectric constant of this material must be taken into account in determining the velocity of propagation. The dielectric constant of the material affects the capacitance per meter of line, C in equations (2) and (3) and is given by $$C_2 = \frac{\pi\epsilon_0\epsilon_r}{\ln(s/b)} \tag{8}$$

for two wire line where $\epsilon_0 = 8.85\times10^{-12}$ the permittivity of free space $\epsilon_r$=relative permittivity of the dielectric s=spacing between the conductors b=radius of the conductors Likewise, the inductance per meter of line, L, in equations (2) and (3) is given by $$L_2 = \frac{\mu_0}{\pi}\ln(s/b) \tag{9}$$

where $\mu_0 = 4\pi\times10^{-7}$ the permeability of free space.

The inductance of the variable inductance wire as given by (3) needs to be doubled if both conductors have the variable inductance central element. FIG. 10 represents a coaxial cable variable velocity open transmission line 100 in which the centre conductor 1100 is a variable inductance wire of radius b, again of the construction illustrated in FIG. 12. The dielectric material 1002 surrounding the centre conductor 1100 determines the capacitance per meter of line C in equations (2) and (3) and is given by $$C_c = \frac{2\pi\epsilon_0\epsilon_r}{\ln(a/b)} \tag{10}$$

where a=radius of the outer conductor 1003.

Likewise, the inductance per meter of line is $$L_c = \frac{\mu_0}{2\pi}\ln(a/b) \tag{11}$$

and the variable inductance term $L_g$ is given by equation (4). It is the design of the outer conductor which differentiates the leaky coaxial cables on the market today. For the purposes of the present invention the exact nature of the outer conductor is not very important. The outer conductor 1003 in FIG. 10 comprises a series of circumferential slots and is surrounded by a jacket material 1004.

Figure 11:
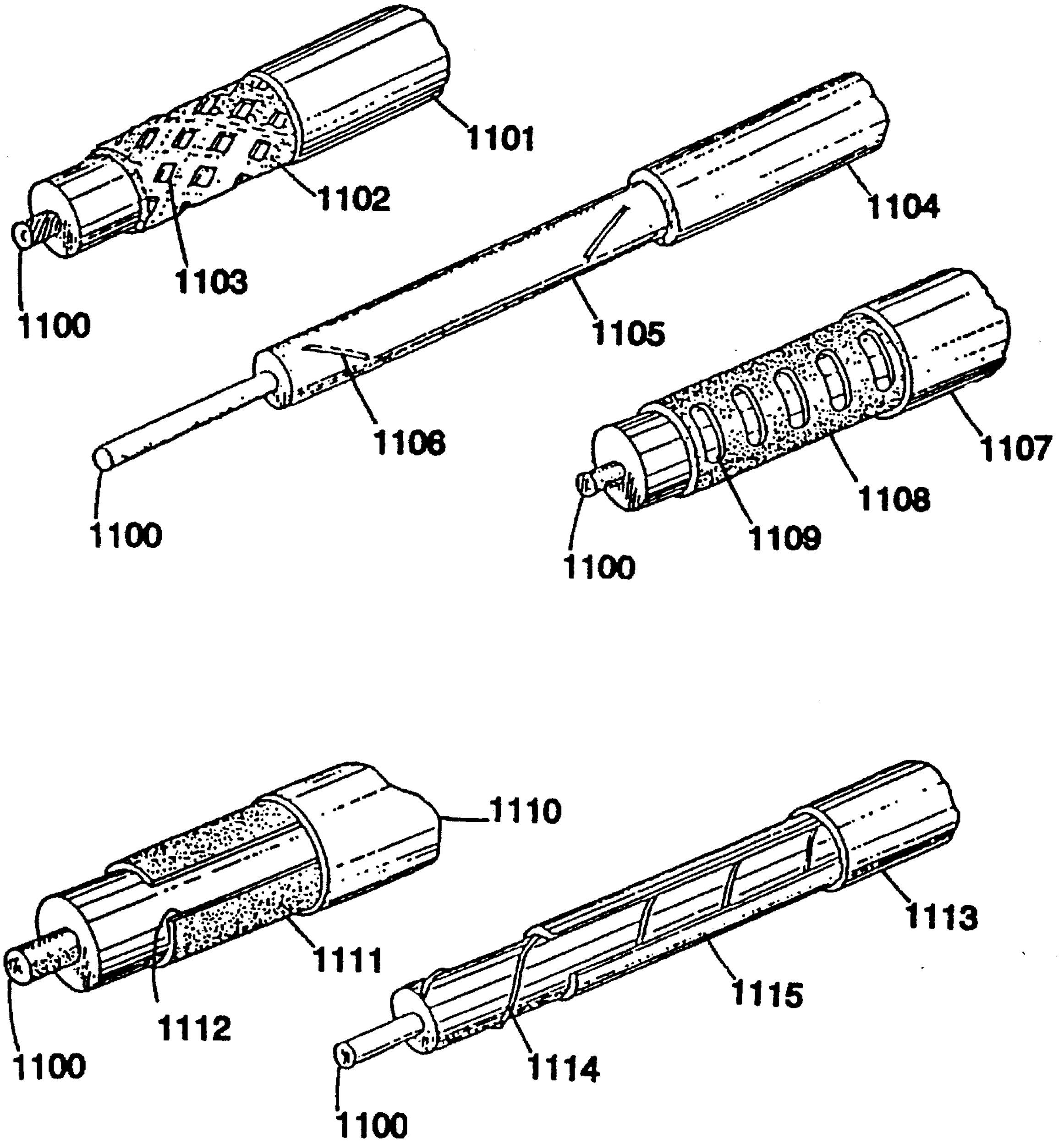
FIG. 11 illustrates five different types of leaky coaxial cable each having a variable velocity central conductor in accordance with the present invention.

Some typical examples of leaky coaxial cables showing their unique outer conductor construction are illustrated in FIG. 11. Cable 1101 comprises a loose braided outer conductor 1102 with diamond shape apertures 1103. Cable 1104 comprises an outer conductor 1105 with widely spaced diagonally cut slots 1106. Cable 1107 comprises a solid metal tube outer conductor 1108 with closely spaced oblong holes 1109 which run circumferentially. Cable 1110 comprises an outer conductor 1111 with a slot outer 1112.

While some of these cables work better than other in terms of attenuation and environmental sensitivity, they each comprise a variable inductance central conductor 1100 so that they can be uses as variable velocity open transmission lines.

FIG. 12 is a perspective view of one embodiment of such a variable inductance conductor 1100. In general, it looks like a standard unilay concentric stranded conductor. Upon closer examination one discovers that the outermost layer of wires 1201 are larger in diameter than those in the central element 1202. These outer wipes are made from copper. There are 18 number 34 gauge copper wires having a diameter of 0.006305 inches (0.000160 meter) running parallel to each other forming the outer surface layer 1201 (one wire thick). The central element 1202 is composed of 38 silicon steel wires of 0.0045 inch (0.0001143 meter) diameter; one in the centre, 7 in the second layer, 12 in the third layer and 18 in the fourth layer. These fine steel wires are insulated from each other by means of a plain enamel finish. Alternatively, any other suitable insulating finish such as Bakelite varnish, epoxy varnish, polyester varnish or silicone varnish may be used. These finishes have been developed to insulate transformer laminations for much the same purpose—to reduce eddy currents. In effect the 38 steel wires of central element 1202 form a permeable core for the 18 copper outer wires. The pitch of the twist on the conductors determines the number of turns per meter, N, required in equation (4) to determine the inductance of the variable inductance conductor. The particular design illustrated in FIG. 12 produces a wire which is equivalent to a 16 gauge wire.

In order to appreciate the significance of the multiconductor central element used in the construction of the variable inductance conductor, one needs to consider the effects of eddy currents in a cylindrical conductor. This is illustrated in FIG. 13 which shows a magnetizing coil 1332 wound around a cylindrical conductor 1333 to create a magnetic flux in the cylindrical conductor 1333. In response to this flux a current flows around the cylindrical conductor 1333 to set up an opposing flux. This induced current is called an eddy current which is illustrated by 1334 in FIG. 13. The effect of eddy currents at high frequencies is to concentrate the magnetic flux and current near the surface of the conductor. If one defines skin depth, $\delta$, as the distance at which the current density has decreased to 1/e (36.8%) of its surface value then $$\delta = \sqrt{\frac{1}{\pi\mu f\sigma}} \tag{12}$$

It is important to note that the skin depth decreases inversely proportionately to the square root of frequency, permeability and conductivity of the conductor.

At high frequencies skin depth in most cylindrical conductors is much less than the radius of the conductor thereby producing an apparent permeability which is much less than the permeability at low frequencies. This phenomenon is described by Mr. Richard M. Bozorth in detail in his textbook entitled, Ferromagnetism, D. Van Nostrand Co. Inc., Princeton, N.J. 1951. The apparent relative permeability of a cylindrical conductor at high frequencies is related to the relative permeability of the conductor at low frequencies by the equation $$\mu_r^* = \frac{252}{f\sigma b}\mu_r \tag{13}$$

where f=frequency (hertz)

$\sigma$=conductivity (mhos/meter)

b=conductor radius (meters)

$\mu_r$=low frequency relative permeability

From equation (13) it is apparent that the smaller the radius of the cylindrical conductor the higher the frequency at which a desired apparent relative permeability can be maintained. Similarly, the conductor should have as low a conductivity (as high of resistance) and as high a low frequency permeability as practical if one is to produce as large a apparent permeability as possible at high frequencies. This is important in selecting an appropriate material for the fine wires used as central element 1202 of the variable inductance conductor shown in FIG. 12.

In order to determine the effective permeability of the multiconductor central element of the variable inductance conductor shown in FIG. 9, one must also take into account the void spaces between the fine wires and the space consumed by the insulation on the fine wires. If one assumes that the outer layer of high conductivity wires has a mean radius of c meters and there are n parallel fine permeable wires of radius b in the central element, then the effective relative permeability of the multiconductor central element is $$\mu_{eff}=n(\mu_r^*-1)(b/c)^2+1 \quad (14)$$

Examining equation (14) one sees that the effective relative permeability of the stranded centre conductor is always less than the apparent relative permeability and greater than unity. When the apparent relative permeability equals unity then so does the effective relative permeability of the stranded central element. It should also be noted that the finer the permeable wires (smaller b) the larger the number of wipes, n, to fill the outer layer of radius, c.

It is apparent from equations (13) and (14) that when designing a variable inductance multiconductor to operate at high frequencies one should select wire for the central element having small diameter, low conductivity (high resistance) and high low frequency relative permeability. In addition, the physical properties of the fine central element wires will determine the strength, flexibility and durability of the variable velocity open transmission line being designed.

The 38 silicon steel 4.5 thousandths of an inch diameter wires shown in the central element 1202 of the variable conductance conductor 1100 illustrated in FIG. 12 meet this design criterion. This will be discussed further once the concept of incremental permeability is introduced.

In order to determine the range of inductance values of a particular variable inductance conductor one must have a knowledge of the B—H magnetization cure for the central element material. In particular one must know how the incremental permeability varies as the central element material is driven around its hysteresis curve.

The permeability of a magnetic material is defined as the ratio of the flux density (B) to the magnetizing force (H), and depends upon the flux and the material. The permeability at very low flux densities, termed the initial permeability, is of particular importance in communication systems, where the current is commonly very weak. The initial permeability of a magnetic material is nearly always much less than the permeability at somewhat higher flux densities.

Coils having magnetic cores are frequently used in communication work under conditions where there is a large direct current magnetization upon which is superimposed a small alternating current magnetization. Under these conditions, one is interested in the inductance that is offered to the superimposed alternating current. This is called incremental permeability and is the parameter which determines the variable inductance of the conductor 1100 shown in FIG. 12.

Figure 14:
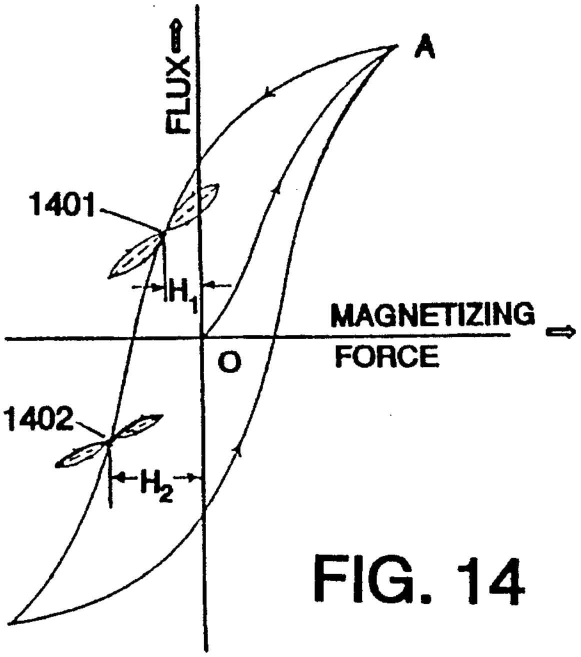
FIG. 14 illustrates a magnetic hysteresis loop with two minor hysteresis loops superimposed indicating a variation in incremental permeability for a core material operating in a time varying magnetic field.

The concept of incremental permeability is illustrated in FIG. 14. When a core that has been thoroughly demagnetized is first magnetized, the relation between current in the winding and core flux is the usual B—H curve, shown as OA in FIG. 14. If the magnetizing current is then successively reduced to zero, reversed, brought back to zero, reversed to the original direction, etc., the flux goes through the familiar hysteresis loop shown in FIG. 14. A direct current flowing through the magnetizing winding then brings the magnetic state of the core to some point on the hysteresis curve, such as 1401 or 1402 in FIG. 14. When an alternating current is now superimposed on this direct current, the result is to cause the flux in the core to go through a minor hysteresis loop that is superimposed upon the usual hysteresis curve. Examples are shown at 1401 and 1402 in FIG. 14 corresponding to direct current magnetization of $H_1$ and $H_2$ respectively.

The incremental permeability of the core, and hence the incremental inductance offered the superimposed alternating current, are proportional to the slope of the line (shown dotted in FIG. 14) joining the two tips of the minor hysteresis loops. The value of this incremental permeability thus defined has two important characteristics. First, for an alternating current the incremental permeability (and hence the inductance of the solenoid) to the superimposed alternating current will be less the greater the direct current. Second, with a given direct current the incremental permeability, and hence the inductance to the alternating current, will increase as the superimposed alternating current becomes larger. These characteristics hold until the flux density becomes so high that the core is saturated.

A wide variety of magnetic materials find use in communication and radio work. Silicon steel is used for the core of power transformers, filter chokes, and audio frequency transformers. Silicon steel cores would normally not be used at radio frequencies since eddy currents would usually reduce the apparent relative permeability to unity; the permeability of free space. It is only by creating a central element of insulated very fine silicon steel wires that an apparent relative permeability greater than unity can be achieved at the HF, VHF and UHF frequencies desired for use in a variable velocity open transmission line.

As described previously, it is important that the fine wires used to make the permeable central element 1202 in the variable inductance wire be insulated from each other. This reduces eddy currents just like the insulation between laminations of a transformer. Because the voltages produced by the eddy currents in the individual wires are very small enamel and varnish insulating finishes are adequate.

Figure 15:
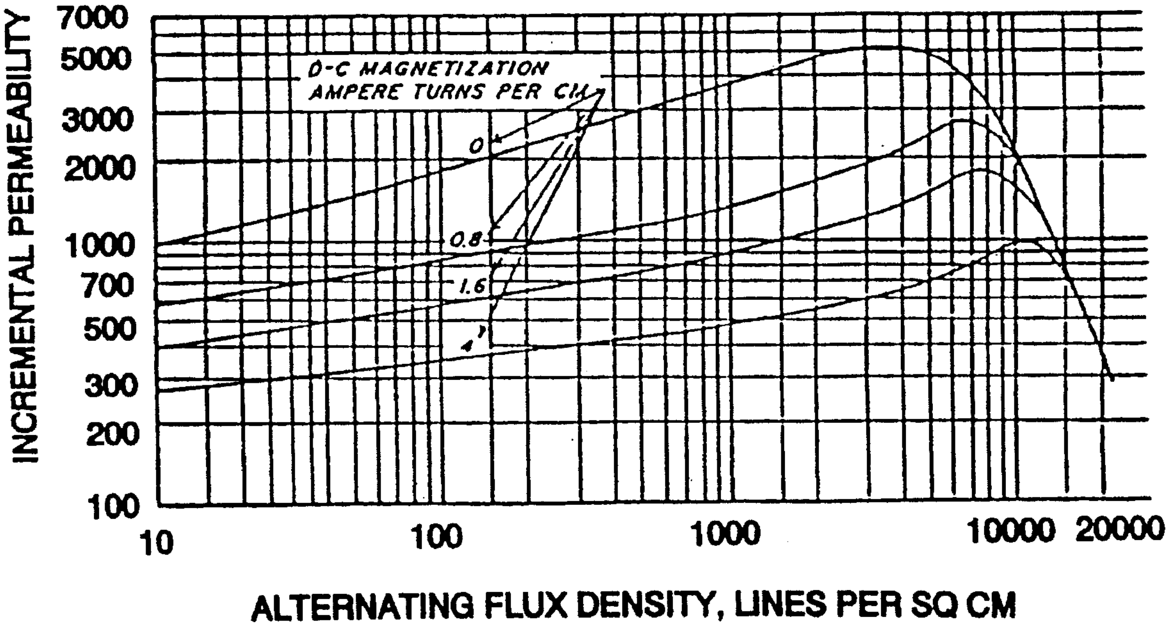
FIG. 15 illustrates the variation of incremental permeability as a function of flux density and amplitude of radio frequency signal.

FIG. 15 illustrates how incremental permeability changes as a function of flux density. If one assumes a relatively low amplitude radio frequency signal having a flux density of 10 lines per square centimetre then incremental relative permeability varies from 1000 to 275 for modulating currents from 0 to 4 ampere turns per centimetre of magnetization. If one assumes two hundred turns per meter (N=200) it would require a peak current of 2 amperes in the outer layer of the variable inductance conductor to cause the 1000 to 275 variation in incremental permeability for a silicon steel multiconductor central element.

A variation in low frequency relative permeability of 1000 to 275 translates into an apparent relative permeability at 100 MHz of 9.4 to 4.9 according to equation (13) if one assumes silicon steel wires of 0.0045 inches (0.0001143 meters) diameter and a conductivity of $2.2\times10^6$ mhos/meter.

As mentioned previously, in the variable inductance conductor 1202 shown in FIG. 12 there are 38 fine silicon steel wires in the central element. There are 18 number 34 gauge copper wires having a diameter of 0.006305 inches (0.000160 meters) forming the outer conductor layer 1201. The result is a multi-conductor wire of approximately 16 gauge of 0.05 inches (0.0013 meters) diameter. The mean radius of the solenoid formed by the outer copper layer is 0.0224 inches (9.00057 meters). Substituting these values into equation (14) one finds that the effective relative permeability of the central element varies from 4.2 to 2.5 as the current in the outer layer of the multiconductor varies from 0 to 4 amperes. With 200 turns per meter on a central element of radius 0.0224 inches (0.00057 meters) the solenoid inductance of the conductor as given by equation (4) varies from 0.215 to 0.128 microhenrys per meter.

If the variable inductance conductor previously described is used to replace the centre conductor in an RG59 type leaky coaxial cable the preferred embodiment of a variable velocity open transmission line is realized. The coaxial inductance of an RG59 type cable as computed using equation (11) is 0.211 microhenrys per meter. In terms of equations (2) and (3) $L_c$=0.211 microhenrys per meter and $L_s$=0.215 to 0.128 microhenrys per meter. If one defines the velocity ratio, $R_v$, as $$R_v=\sqrt{\frac{L_c}{L_c+L_s}} \tag{15}$$

one can compute range of velocity of propagation for the open transmission line with the variable inductance centre conductor relative to the same RG59 type cable with a standard centre conductor. Assuming a standard velocity of 79 percent of that of free space for a RG59 type cable with a foamed polyethylene dielectric one finds that the variable velocity open transmission line has a velocity ranging from 55 to 62 percent that of free space. This is the range of velocities illustrated in FIG. 8. The 200 turns per meter twist on the outer layer 1201 of the variable inductance conductor shown in FIG. 12 has a lay angle of 35.6 degrees.

At radio frequencies the current flows largely on the outer surface of the outer copper layer of wires. Even at low frequencies the resistance of the 18 copper wires forming the outer layer 1201 is only 8 percent of the resistance of the 38 silicon steel wires forming the central element 1202. The current carrying capacity of the 18 copper wires is 1 ampere at 700 circular mils per ampere. The current carried by the steel and the heat sinking effect of the steel make considerably higher modulating currents practical. The 2 amperes of peak current required in the preferred embodiment corresponds to 1.4 rms amperes which is not a problem.

As mentioned, previously the variable inductance conductor when used in a transmission line varies the characteristic impedance of the line at the same time as it varies the velocity. If a fixed impedance is used to terminate a variable velocity line one needs to consider the effects of standing waves which would result when the load is mismatched. If the variation in impedance and velocity is relatively small, the standing wave effects can be ignored. In situations where this is not the case, one method of overcoming the problem is through the use of a section of tapered transmission line.

Figure 16:
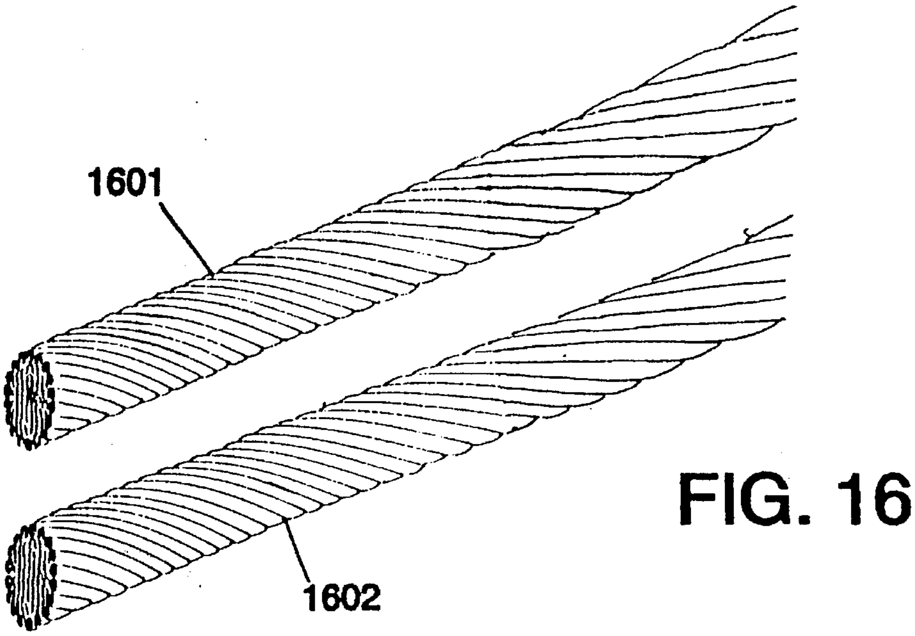
FIG. 16 illustrates a tapered helically wound termination section for use at both ends of the variable velocity open transmission line to provide matched terminations.

A tapered transmission line section suitable for matching the characteristic impedance of a variable velocity open two wire line to a constant impedance line is illustrated in FIG. 16. A length of transmission line in which the characteristic impedance varies gradually and continuously from one value to another is said to be tapered. A travelling wave passing through such a section will have its ratio of voltage to current transformed in accordance with the ratio of the characteristic impedances involved. The requirement for a satisfactory taper is that the change in characteristic impedance per wavelength must not be too large; otherwise, the tapered section will introduce reflections. That is, if the change in characteristic impedance per wavelength is excessive, then the tapered section acts as a lumped irregularity rather than producing merely a gradual transformation. A general rule of thumb is a taper over one wavelength can transform impedance ratios of 1.3 and up to 4 depending upon the amount of standing wave which can be tolerated.

The taper is achieved by gradually reducing the helical pitch on the variable inductance conductors 1601 and 1602 of the transmission line. While this is illustrated for a two wire line in FIG. 16, it is clear that the same type of tapered helically wound conductor can be used as the centre conductor of a coaxial line to have the same effect. If the pitch or number of turns per meter decreases sufficiently over the taper, the solenoidal inductance will be negligible at the constant impedance end of the taper and yet at the variable impedance end it will match the impedance of the line. The ratio of the variable impedance to the fixed impedance is given by the inverse of the velocity ratio, $R_v$, given by equation (15).

For the specific open transmission line presented as a preferred embodiment of the present invention, the impedance ratio is 1.4. Hence, it is adequate to use a tapered line of approximately one wavelength long. At 100 Mhz this corresponds to three meters. This would be sufficient for all frequencies above 100 MHz.

While the velocity modulation of the open transmission line by driving the magnetic central element material around its hysteresis curve is a very nonlinear function, the resulting primary modulation frequency of the velocity is twice that of the modulating current. In other words, since the major hysteresis curve is symmetrical, the incremental inductance will go through two identical cycles for each cycle around the hysteresis loop. The net result is a velocity modulation at twice the frequency of the modulating current.

The question arises as to what frequency alternating current should be used to modulate the velocity; the selection of the frequency of $V_m$, voltage source 609 in FIG. 6. From a practical point of view, the modulating frequency must be sufficiently high to ensure that the mobile unit or target does not move an appreciable distance in terms of wavelength of the radio frequency being used during one cycle of modulation.

For many applications it is reasonable to use the local power frequency for $V_m$. In North America this is 60 Hz and in Europe is 50 Hz. With a 50 Hz modulation source $V_m$ the resulting velocity modulation is 100 Hz which has a period of 10 milliseconds. The wavelength at 100 MHz is 3 meters. If one accepts a movement of one tenth of a wavelength per modulation period this corresponds to movement at 30 meters per second or 67 miles per hour. Naturally, a high frequency source of modulation can accommodate faster motion. As will be discussed later, the higher the modulation frequency and the longer the transmission line the larger the bandwidth of the received signal.

As described previously, the variable velocity open transmission line modulates the phase and amplitude of signals coupled into the line. In order to design a variable velocity open transmission line system one needs to understand some of the basic properties of phase and amplitude modulation in order to program the microprocessor 211 to process the received signal to obtain the desired results.

A phase-modulated wave is a sine wave in which the value of the reference phase θ is varied so that its magnitude is proportional to the instantaneous amplitude of the modulated signal. Thus, for sinusoidal phase modulation at a frequency $f_m$ one would have $$\theta=\theta_0+m_p \sin (2\pi f_{mt}) \tag{16}$$

where $\theta_0$ is the phase in the absence of modulation, while $m_p$ is the maximum value of the phase change introduced by modulation, and is called the modulation index. From equation (1) it follows that $$m_p=\frac{2\pi f}{v_0}\left(\frac{1}{v_{min}}-\frac{1}{v_{max}}\right)l \tag{17}$$

where f=radio frequency $v_0$=velocity of light in free space $v_{min}$=minimum relative line velocity $v_{max}$=maximum relative line velocity If one assumes f=100 Mhz, $v_0=3\times10^8$ meters per second, $v_{max}$=0.62 and $v_{min}$==0.55 then $$m_p=0.43l \text{ radians} \quad (18)$$

where l is the distance along the line in meters or $$m_p=24.6l \text{ degrees} \quad (19)$$

The maximum frequency deviation produced by this phase modulation is $$\Delta f=f_m m_p \quad (20)$$

Substituting equation (18) into (20) one finds that the maximum frequency deviation for the particular design is $$\Delta f=51.6l \text{ hertz} \quad (21)$$

Assuming a 60 Hz current is used to modulate the central element. Hence, for a 500 meter variable velocity leaky coaxial cable line the maximum frequency deviation would be 25.8 KHz. Because the modulation index is large the bandwidth utilization is approximated by twice the maximum frequency deviation or 51.6 KHz. This is approximately the bandwidth of a FM radio channel.

If the phase modulation expressed in equation (16) is applied to a sinusoidal carrier frequency, $f_c$, the resulting modulated signal can be expressed as $$e(t)=A \sin [2\pi f_c t+m_p \sin (2\pi f_m t)] \quad (22)$$

which can be expanded in terms of its frequency components as $$\begin{aligned} e(t) &= A\{J_0(m_p)\sin(2\pi f_c t) + J_1(m_p)[\sin(2\pi(f_c+f_m)t) - \\ &\quad \sin(2\pi(f_c-f_m)t)] + J_2(m_p)[\sin(2\pi(f_c+2f_m)t) - \\ &\quad \sin(2\pi(f_c-2f_m)t)] + \ldots\} \end{aligned}$$

where $J_n(m_p)$ is the Bessel function of the First Kind and nth order with argument $m_p$ the modulation index and A is the peak amplitude. The spectrum usage for a phase modulated signal having a constant modulation frequency but for several values of $m_p$ is illustrated in FIG. 17.

Figure 17:
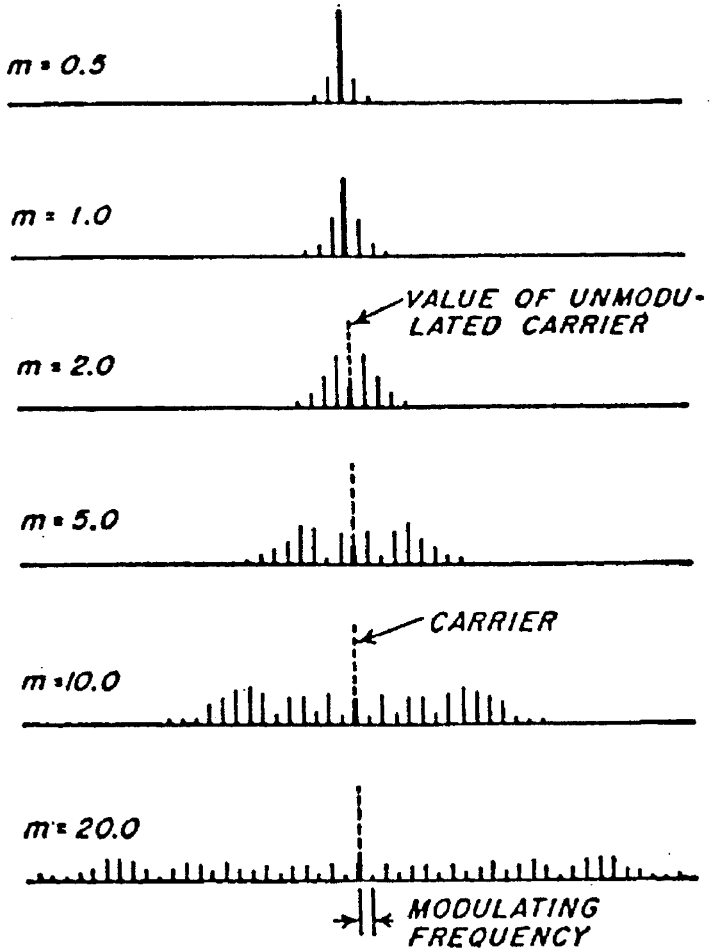
FIG. 17 illustrates the spectrum utilized by a phase modulated signal.

The spectrum utilization shown in FIG. 17 is useful in that it illustrates that the larger the modulation index the wider the bandwidth. In the case of a variable velocity open transmission line sensor the longer the distance the signal propagates in the line, the wider the bandwidth and the more sidebands that are created.

When one adds amplitude modulation at the same modulation frequency the frequency spectrum is further compounded. In this case, each frequency component of the phase modulated signal can be considered as a separate carrier that is individually amplitude modulated. This amplitude modulation creates sidebands at plus and minus the modulation frequency about the individual component under consideration. The net result is very complicated but will continue to have components only at the same frequencies as the original phase modulated signal but with somewhat different amplitudes. At large amplitude modulation indices the higher sidebands will be quite similar to those of the phase modulation but the amplitude modulation will have a significant impact on the components near the carrier frequency. This very general description allows one to conclude that the maximum bandwidth utilization with both amplitude and phase modulation is approximately twice the maximum frequency deviation given in equation (21).

If only one transmitter or one target is present at one time the computation of location both in distance along the line and radial distance from the line is very simple. Measure the number of phase rotations and the maximum to minimum amplitude of the received signal over a modulation cycle and use equations (1), (6) and (7) to compute l and r knowing the maximum and minimum relative velocities along the transmission line.

For embodiments of the invention which, unlike the "synergistic sensor", do not use the signals from a remote, independent transmitter, frequency and/or time multiplexing may be used to accommodate multiple mobile units.

In the case of a "synergistic sensor," multiple targets can be located but only in a very approximate manner by examining the content of the sidebands of the received signal. Targets near the processor will not produce significant upper sidebands while ones at the furthest end produce the upper sidebands but less of the lower sidebands.

In summary, when one designs a variable velocity open transmission line system for particular applications the following design parameters are important:

- type of open transmission line best suited for the application in terms of attenuation, external field, susceptibility to environmental conditions etc. two wire lines and leaky coaxial cables are only two of a number of potential open transmission lines which could be utilized.
- selection of rf carrier frequency to produce the desired radial range with acceptable attenuation and to comply with radio regulations.
- select a modulation current amplitude and frequency to achieve the desired degree of velocity modulation whether it is a continuous type of modulation or a number of discrete steps.
- select a permeable central element wire diameter, relative permeability and conductivity to produce the desired effective permeability of central element.
- select the outer conductor wires to have the desired conductivity and current carrying capacity.
- select the number of turns per meter for the multiconductor variable inductance wire to have the desired range of inductances.

While a leaky coaxial cable type of open transmission line has been used to describe the present invention, it will be apparent to those skilled in the art of the foregoing description and accompanying drawings that it can easily be applied to two wire lines and any other form of open transmission lines. Likewise, it will be apparent that the various features offered by the invention have different degrees of relevance to different applications. In some cases, the distance along the line is all that is important while in other cases radial distance may be very important. Although only certain embodiments of the present invention have been described and illustrated with reference to several modes of operation, the present invention is not limited to the features of these embodiments and these applications, but includes all variations and modifications within the scope of the appended claims. It should be noted that embodiments of the invention could be implemented using continuous wave (CW) transmissions or any AM, FM or PM modulated transmission. In many applications it is desirable to also use the open transmission line for communication and hence, the signals would be modulated.

INDUSTRIAL APPLICABILITY

Embodiments of the invention using signals from independent transmitters, preferably with variable velocity open transmission lines, system can detect and locate human intruders crossing over or through the open transmission line.

The variable velocity open transmission line system described herein provides a new way of determining the location of a mobile entity. When used as a sensor employing commercial radio or TV transmissions it offers a number of advantages over other sensors. Since such a system does not require the transmission of radio frequency signals other than those already present due to commercial stations the radio regulatory concerns are minimized, there is no possibility of interference between sensors and no source of radio frequency energy to attract attention to the sensor. In addition, there are obvious cost reductions in comparison to two cable sensors by having only one open transmission line both in equipment cost and cost of installation. It should be noted, however, that systems employing the variable velocity concept are not limited to the use of independent transmitters. The ability to locate a target along the sensor length using a variable velocity open transmission line is very useful in a number of applications.

Variable velocity transmission lines embodying the invention advantageously simplify open transmission line systems and may find application in other situations where a variable velocity transmission line has utility.

I claim:

1. An open transmission line system for detecting an entity moving within a defined pathway, the system utilizing transmissions from a remote, independent radio or television station transmitting at a known frequency, said system comprising an open transmission line extending along said pathway; receiver means connected to said transmission line, for receiving a first signal directly from said remote station and a second signal coupled into and transmitted along said transmission line from said remote station; and signal processing means coupled to said receiver means for processing said first and second signals to detect the movement of said entity relative to said open transmission line.

2. A system according to claim 1, wherein said receiver means comprises a first receiver for receiving said first signal and a second receiver for receiving said second signal, said first receiver and said second receiver being tuned to the same frequency.

3. A system according to claim 2, wherein said first receiver and said second receiver share a common local oscillator.

4. A system according to claim 1, wherein said system comprises means for utilizing transmissions from a plurality of said remote, independent transmitters, said signal processing means further comprising selector means for controlling said receiver means to receive said transmissions selectively.

5. A system according to claim 4, wherein said receiver means is operable to select two transmission frequencies alternately.

6. A system according to claim 4, wherein said receiver means is controlled by said signal processing means to select two transmission frequencies alternately and repeatedly, and to select a third transmission frequency as a substitute if and when transmission at one of said two transmission frequencies ceases to be received.

7. A system according to claim 1, wherein said signal processing means comprises means for deriving a gain control signal (AGC-R; AGC-L) and applying it to said receiver means to control the gain thereof.

8. A system according to claim 1, wherein said receiver means comprises a first receiver for receiving said first signal and a second receiver for receiving said second signal, said first receiver and said second receiver being tuned to the same frequency, and said signal processing means comprises means for deriving a gain control signal (AGC-R; AGC-L) and applying it to said receiver means to control the gain thereof.

9. A system according to claim 1, wherein said receiver means comprises a first receiver for receiving said first signal and a second receiver for receiving said second signal, said first receiver and said second receiver being tuned to the same frequency and sharing a common local oscillator, said signal processing means comprising means for deriving a gain control signal (AGC-R; AGC-L) and applying it to said receiver means to control the gain thereof.

10. A system according to claim 1, wherein said system comprises means for utilizing transmissions from a plurality of said remote, independent transmitters, said signal processing means further comprising selector means for controlling said receiver means to receive said transmissions selectively, and means for deriving a gain control signal (AGC-R; AGC-L) and applying it to said receiver means to control the gain thereof.

11. A system according to claim 1, wherein said system comprises means for utilizing transmissions from a plurality of said remote, independent transmitters, said receiver means being operable to select two transmission frequencies alternately, said signal processing means further comprises selector means for controlling said receiver means to select two transmission frequencies alternately and means for deriving a gain control signal (AGC-R; AGC-L) and applying it to said receiver means to control the gain thereof.

12. A system according to claim 1, wherein said system comprises means for utilizing transmissions from a plurality of said remote, independent transmitters, said signal processing means further comprising selector means for controlling said receiver means to receive three said transmissions selectively, said receiver means is operable by said signal processing means to select two transmission frequencies alternately and repeatedly, and to select a third transmission frequency as a substitute if and when transmissions at one of said two transmission frequencies ceases to be received, and said signal processing means comprises means for deriving a gain control signal (AGC-R; AGC-L) and applying it to said receiver means to control the gain thereof.

13. A system according to claim 12, wherein said signal processing means compensates for variations in said gain when processing said first and second signals.

14. A system according to claim 1, wherein said open transmission line is divided into a plurality of blocks, a said radio receiver means and signal processing means being associated with each block.

15. A system according to claim 14, wherein said open transmission line is a leaky coaxial cable having a centre conductor.

16. A system according to claim 14, wherein said open transmission line is a two wire line, each line having a conductor, said conductors being parallel and spaced apart from each other.

17. A system according to claim 15, wherein said conductor comprises a magnetically permeable central element and a plurality of conductive wires helically wrapped around said central element.

18. A system according to claim 15, wherein said open transmission line is a two wire line, each line having a conductor, said conductors being parallel and spaced apart from each other, and each of said conductors comprises a magnetically permeable central element and a plurality of conductive wires helically wrapped around said central element.

19. A system according to claim 15, wherein said conductor comprises a magnetically permeable central element and a plurality of conductive wires helically wrapped around said central element, said central element being formed by a plurality of fine wires insulated from each other.

20. A system according to claim 15, wherein said open transmission line is a two wire line, each line having a conductor, said conductors being parallel and spaced apart from each other, each said conductor comprising a magnetically permeable central element and a plurality of conductive wires helically wrapped around said central element, said central element being formed by a plurality of fine wires insulated from each other.

21. A system according to claim 15, wherein said conductor comprises a magnetically permeable central element and a plurality of conductive wires helically wrapped around said central element, said central element being formed by a plurality of fine wires insulated from each other, the system further comprising means for producing and applying to said conductive wires a periodically varying driving signal thereby to vary the velocity of propagation of an electromagnetic signal along said line.

22. A system according to claim 15, wherein said open transmission line is a two wire line, each line having a conductor, said conductors being parallel and spaced apart from each other, and each of said conductors comprises a magnetically permeable central element and a plurality of conductive wires helically wrapped around said central element, said central element being formed by a plurality of fine wires insulated from each other, the system further comprising means for producing and applying to said conductive wires a periodically varying driving signal thereby to vary the velocity of propagation of an electromagnetic signal along said line.

23. An open transmission line system for locating a mobile entity within a defined pathway, in the presence of an alternating electromagnetic field extending in the vicinity both of said pathway and said mobile entity, said system comprising an open transmission line to extend along said pathway; and generating means coupled to said transmission line for producing and applying a driving signal to said transmission line; said transmission line including means for receiving said electromagnetic field and producing therefrom a transmission signal which propagates along said transmission line; and means responsive to said driving signal for controlling the velocity of propagation of said transmission signal along said transmission line; said generating means including means for varying said driving signal to vary the velocity of propagation of said transmission signal along said line, and signal processing means coupled to one of said transmission line and said mobile entity for receiving said transmission signal and for determining, utilizing the variation in the velocity of said transmission signal, the location of said mobile entity relative to said transmission line.

24. A system according to claim 23, wherein said means for varying said driving signal is operable to vary said driving signal periodically.

25. A system according to claim 24, wherein said open transmission line comprises a leaky coaxial cable.

26. A system according to claim 25, wherein said open transmission line comprises a two wire transmission line.

27. A system according to claim 24, wherein further including radio transmitter means associated with said mobile entity for generating said electromagnetic field, and radio receiver means connected to said transmission line to receive said transmission signal, said signal processing means being coupled to said radio receiver means.

28. A system according to claim 24, wherein said open transmission line comprises a leaky coaxial cable, and further including radio transmitter means associated with said mobile entity for generating said electromagnetic field, and radio receiver means connected to said transmission line to receive said transmission signal, said signal processing means being coupled to said radio receiver means.

29. A system according to claim 24, wherein said open transmission line comprises a two wire transmission line, and further including radio transmitter means associated with said mobile entity for generating said electromagnetic field, and radio receiver means connected to said transmission line to receive said transmission signal, said signal processing means being coupled to said radio receiver means.

30. A system according to claim 24, further including radio transmitter means connected to said transmission line for generating said electromagnetic field, and radio receiver means associated with said mobile entity for receiving said transmission signal, said signal processing means being coupled to said radio receiver means.

31. A system according to claim 24, wherein said open transmission line comprises a leaky coaxial cable, and further including radio transmitter means connected to said transmission line for generating said electromagnetic field, and radio receiver means associated with said mobile entity for receiving said transmission signal, said signal processing means being coupled to said radio receiver means.

32. A system according to claim 24, wherein said open transmission line comprises a two wire transmission line, and further including radio transmitter means connected to said transmission line for generating said electromagnetic field, and radio receiver means associated with said mobile entity for receiving said transmission signal, said signal processing means being coupled to said radio receiver means.

33. A system according to claim 24, including radio transmitter means connected to said transmission line for generating said electromagnetic field, transponder means associated with said mobile entity for receiving said transmission signal and responsive thereto for producing and radiating a second transmission signal, radio receiver means connected to said transmission line for receiving said second transmission signal, said signal processing means being coupled to said radio receiver means.

34. A system according to claim 24, wherein said open transmission line comprises a leaky coaxial cable, and further including radio transmitter means connected to said transmission line for generating said electromagnetic field, transponder means associated with said mobile entity for receiving said transmission signal and responsive thereto for producing and radiating a second transmission signal, radio receiver means connected to said transmission line for receiving said second transmission signal, said signal processing means being coupled to said radio receiver means.

35. A system according to claim 24, wherein said open transmission line comprises a two wire transmission line, and further including radio transmitter means connected to said transmission line for generating said electromagnetic field, transponder means associated with said mobile entity for receiving said transmission signal and responsive thereto for producing and radiating a second transmission signal, and radio receiver means connected to said transmission line for receiving said second transmission signal, said signal processing means being coupled to said radio receiver means.

36. A system according to claim 24, wherein said electromagnetic field is generated by at least one remotely located independent radio or television station transmitting at a known frequency, said system including a radio receiver connected to said transmission line to receive a said transmission signal of a frequency corresponding to that transmitted by such independent station, said signal processing means being coupled to said radio receiver means.

37. A system according to claim 24, wherein said open transmission line comprises a leaky coaxial cable and said electromagnetic field is generated by at least one remotely located independent radio or television station transmitting at a known frequency, said system including a radio receiver connected to said transmission line to receive a said transmission signal of a frequency corresponding to that transmitted by such independent station, said signal processing means being coupled to said radio receiver means.

38. A system according to claim 24, wherein said open transmission line comprises a two wire transmission line and said electromagnetic field is generated by at least one remotely located independent radio or television station transmitting at a known frequency, said system including a radio receiver connected to said transmission line and adapted to receive a said transmission signal of a frequency corresponding to that transmitted by such independent station, said signal processing means being coupled to said radio receiver means.

39. A system according to claim 36, wherein said known frequency transmission comprises that of a commercial radio or television station.

40. A system according to claim 24, wherein said electromagnetic field is generated by at least one remotely located commercial radio or television station transmitting at a known frequency, said system including radio receiver means connected to said transmission line, said signal processing means being connected to said radio receiver means, said radio receiver means including means for receiving both said transmission signal and a second signal received directly from said remote station, said signal processing means including means responsive to said transmission signal and to said second signal for producing a third signal in which modulation from said commercial station has been removed.

41. A system according to claim 24, wherein said open transmission line comprises a leaky coaxial cable and said electromagnetic field is generated by at least one remotely located commercial radio or television station transmitting at a known frequency, said system including radio receiver means connected to said transmission line, said signal processing means being connected to said radio receiver means, said radio receiver means including means for receiving both said transmission signal and a second signal received directly from said remote station, said signal processing means including means responsive to said transmission signal and to said second signal for producing a third signal in which modulation from said commercial station has been removed.

42. A system according to claim 24, wherein said open transmission line comprises a two wire transmission line and said electromagnetic field is generated by at least one remotely located commercial radio or television station transmitting at a known frequency, said system including radio receiver means connected to said transmission line, said signal processing means being connected to said radio receiver means, said radio receiver means including means for receiving both said transmission signal and a second signal received directly from said remote station, said signal processing means including means responsive to said transmission signal and to said second signal for producing a third signal in which modulation from said commercial station has been removed.

43. A system according to claim 24, wherein said electromagnetic field is generated by at least two remotely located commercial radio or television stations each transmitting at different known frequencies, said system including radio receiver means connected to said transmission line for receiving a plurality of transmission signals each having a frequency corresponding to the frequency of one of said commercial stations, said signal processing means being coupled to said radio receiver means.

44. A system according to claim 24, wherein said open transmission line comprises a leaky coaxial cable and said electromagnetic field is generated by at least two remotely located commercial radio or television stations each transmitting at different known frequencies, said system including radio receiver means connected to said transmission line for receiving a plurality of transmission signals each having a frequency corresponding to the frequency of one of said commercial stations, said signal processing means being coupled to said radio receiver means.

45. A system according to claim 24, wherein said open transmission line comprises a two wire transmission line and said electromagnetic field is generated by at least two remotely located commercial radio or television stations each transmitting at different known frequencies, said system including radio receiver means connected to said transmission line for receiving a plurality of transmission signals each having a frequency corresponding to the frequency of one of said commercial stations, said signal processing means being coupled to said radio receiver means.

46. A system according to claim 23, wherein said transmission line includes a variable inductance conductor means comprising a magnetically permeable central element and a conductor around said central element, said central element and said conductor together forming said means responsive to said driving signal for varying the velocity of propagation of said transmission signal along said line.

47. A system according to claim 46, wherein said conductor comprises a plurality of conductive wires extending parallel to each other and helically wrapped around said permeable central element.

48. A system according to claim 46, wherein said permeable central element comprises a plurality of fine permeable wires insulated from each other so as to reduce eddy current losses.

49. A system according to claim 46, wherein said conductor comprises a plurality of conductive wires extending parallel to each other and helically wrapped around said permeable central element, and said permeable central element comprises a plurality of fine permeable wires insulated from each other so as to reduce eddy current losses.

50. A system according to claim 48, wherein said wires of said conductor are formed from copper, said fine permeable wires of said central element are fine insulated steel wires, said copper and said steel wires all being twisted to create a helical winding over said magnetically permeable central element.

51. A system according to claim 48, wherein said conductor comprises a plurality of conductive wires extending parallel to each other and helically wrapped around said permeable central element, and said wires of said conductor are formed from copper, said fine permeable wires of said central element are fine insulated steel wires, said copper and said steel wires all being twisted to create a helical winding over said magnetically permeable central element.

52. A system according to claim 47, wherein said transmission line is a leaky coaxial cable, said conductor and said permeable central element forming a centre conductor of said cable, a dielectric material surrounding said centre conductor, and a cylindrical outer conductor extending around said dielectric material, said outer conductor having apertures therein to provide a controlled amount of coupling of electromagnetic energy between the inside and the outside of said outer conductor, and an insulating protective outer jacket outside said outer conductor.

53. A system according to claim 47, wherein said permeable central element comprises a plurality of fine permeable wires insulated from each other so as to reduce eddy current losses and said transmission line is a leaky coaxial cable, said conductor and said permeable central element forming a centre conductor of said cable, a dielectric material surrounding said centre conductor, and a cylindrical outer conductor extending around said dielectric material, said outer conductor having apertures therein to provide a controlled amount of coupling of electromagnetic energy between the inside and the outside of said outer conductor, and an insulating protective outer jacket outside said outer conductor.

54. A system according to claim 48, wherein said conductor comprises a plurality of conductive wires extending parallel to each other and helically wrapped around said permeable central element, said permeable central element comprises a plurality of fine permeable wires insulated from each other so as to reduce eddy current losses, and said transmission line is a leaky coaxial cable, said conductor and said permeable central element forming a centre conductor of said cable, a dielectric material surrounding said centre conductor, and a cylindrical outer conductor extending around said dielectric material, said outer conductor having apertures therein to provide a controlled amount of coupling of electromagnetic energy between the inside and the outside of said outer conductor, and an insulating protective outer jacket outside said outer conductor.

55. A system according to claim 48, wherein said conductor comprises a plurality of conductive wires extending parallel to each other and helically wrapped around said permeable central element, said permeable central element comprises a plurality of fine permeable wires insulated from each other so as to reduce eddy current losses, said wires of said conductor are formed from copper, said fine permeable wires of said central element are fine insulated steel wires, said copper and said steel wires all being twisted to create a helical winding over said magnetically permeable central element, and said transmission line is a leaky coaxial cable, said conductor and said permeable central element forming a centre conductor of said cable, a dielectric material surrounding said centre conductor, and a cylindrical outer conductor extending around said dielectric material, said outer conductor having apertures therein to provide a controlled amount of coupling of electromagnetic energy between the inside and the outside of said outer conductor, and an insulating protective outer jacket outside said outer conductor.

56. A system according to claim 48, wherein said permeable central element comprises a plurality of fine permeable wires insulated from each other so as to reduce eddy current losses, said wires of said conductor are formed from copper, said fine permeable wires of said central element are fine insulated steel wires, said copper and said steel wires all being twisted to create a helical winding over said magnetically permeable central element, and said transmission line is a leaky coaxial cable, said conductor and said permeable central element forming a centre conductor of said cable, a dielectric material surrounding said centre conductor, and a cylindrical outer conductor extending around said dielectric material, said outer conductor having apertures therein to provide a controlled amount of coupling of electromagnetic energy between the inside and the outside of said outer conductor, and an insulating protective outer jacket outside said outer conductor.

57. A system according to claim 47, wherein said open transmission line is a two wire line, comprising two said conductor elements each comprising a said central element and magnetically permeable central element and a said conductor therearound, each magnetically permeable central element and its associated conductor forming one of the wires of said two wire line.

58. A system according to claim 46, wherein said permeable central element comprises a plurality of fine permeable wires insulated from each other so as to reduce eddy current losses, and said open transmission line is a two wire line, comprising two said conductor elements each comprising a said central element and magnetically permeable central element and a said conductor therearound, each magnetically permeable central element and its associated conductor forming one of the wires of said two wire line.

59. A system according to claim 47, wherein said permeable central element comprises a plurality of fine permeable wires insulated from each other so as to reduce eddy current losses, and said open transmission line is a two wire line, comprising two said conductor elements each comprising a said central element and magnetically permeable central element and a said conductor therearound, each magnetically permeable central element and its associated conductor forming one of the wires of said two wire line.

60. A system according to claim 46, wherein said permeable central element comprises a plurality of fine permeable wires insulated from each other so as to reduce eddy current losses, said wires of said conductor are formed from copper, said fine permeable wires of said central element are fine insulated steel wires, said copper and said steel wires all being twisted to create a helical winding over said magnetically permeable central element, and said open transmission line is a two wire line, comprising two said conductor elements each comprising a said central element and magnetically permeable central element and a said conductor therearound, each magnetically permeable central element and its associated conductor forming one of the wires of said two wire line.

61. A system according to claim 46, wherein said conductor comprises a plurality of conductive wires extending parallel to each other and helically wrapped around said permeable central element, said permeable central element comprises a plurality of fine permeable wires insulated from each other so as to reduce eddy current losses, said wires of said conductor are formed from copper, said fine permeable wires of said central element are fine insulated steel wires, said copper and said steel wires all being twisted to create a helical winding over said magnetically permeable central element, and said open transmission line is a two wire line, comprising two said conductor elements each comprising a said central element and magnetically permeable central element and a said conductor therearound, each magnetically permeable central element and its associated conductor forming one of the wires of said two wire line.

62. A method of locating a mobile entity relative to an open transmission line extending along a defined pathway in the presence of an alternating electromagnetic field extending along said pathway, wherein said method comprises the steps of detecting at a predetermined location a transmission signal propagating along said transmission line, modulating at low frequency the velocity at which said transmission signal propagates along said line, thereby modulating the phase angle of said transmission signal as it propagates along said line, detecting such phase angle modulation at said predetermined location, and computing utilizing said phase angle modulation, the distance along said line between said mobile entity and said predetermined location.

63. A method according to claim 62, wherein the velocity modulation of said transmission signal produces an amplitude modulation of the transmission signal detected at said predetermined location, said method including the step of determining, utilizing said amplitude modulation, the radial distance of said entity from said line.

64. A method according to claim 63, wherein said step of determining said radial distance includes the steps of measuring the amplitude modulation of said transmission signal detected at said predetermined location, calculating the portion of such amplitude modulation produced by travel of said transmission signal along said line, subtracting the calculated amplitude modulation from the measured amplitude modulation, and utilizing the difference to determine said radial distance.

* * * * *